United States Patent [19]
Wakabayashi et al.

[11] Patent Number: 5,445,340
[45] Date of Patent: Aug. 29, 1995

[54] FILM FEEDING DEVICE FOR CAMERA

[75] Inventors: Tsutomu Wakabayashi, Tokyo; Koichi Daitoku, Sagamihara; Akira Ezawa, Tokyo, all of Japan

[73] Assignee: Nikon Corporation, Tokyo, Japan

[21] Appl. No.: 351,146

[22] Filed: Nov. 30, 1994

Related U.S. Application Data

[63] Continuation of Ser. No. 236,152, May 2, 1994, abandoned, which is a continuation of Ser. No. 144,618, Nov. 1, 1993, abandoned, which is a continuation of Ser. No. 620,614, Dec. 3, 1990, abandoned.

[30] Foreign Application Priority Data

Dec. 4, 1989 [JP] Japan .................. 1-313496
Jan. 30, 1990 [JP] Japan .................. 2-17876

[51] Int. Cl.⁶ .................. G03B 1/18; B65H 20/00
[52] U.S. Cl. .................. 242/356; 354/173.1; 242/332.2; 242/340; 242/357; 242/545
[58] Field of Search .................. 242/71.6, 332.1, 332.2, 242/333.2, 356, 563, 564, 538.1, 538.4, 340, 357, 534, 540, 545; 354/173.1, 173.11

[56] References Cited

U.S. PATENT DOCUMENTS

| | | | |
|---|---|---|---|
| 4,482,226 | 11/1984 | Tamamura et al. | 242/356 X |
| 4,589,604 | 5/1986 | Yagi et al. | 242/356 |
| 4,659,201 | 4/1987 | Suzuki et al. | 354/173.1 |
| 4,671,635 | 6/1987 | Ohara et al. | 354/173.1 |
| 4,832,275 | 5/1989 | Robertson | 354/275 X |
| 4,885,599 | 12/1989 | Goto et al. | 354/173.11 |
| 5,061,950 | 10/1991 | Suzuki et al. | 354/173.11 |

FOREIGN PATENT DOCUMENTS 2-154240 6/1990 Japan .................. 354/275

*Primary Examiner*—John Q. Nguyen
*Attorney, Agent, or Firm*—Shapiro and Shapiro

[57] ABSTRACT

A film feeding device for a camera uses first and second electric motors associated with first and second planetary gearing mechanisms, respectively. In one embodiment, the first motor and first planetary gearing mechanism drive a spool shaft of a film cartridge to supply film to a winding spool. The winding spool is driven by the second motor and second planetary gearing mechanism to wind film onto the winding spool, at which time the first motor is stopped and the first planetary gearing mechanism is automatically disconnected from the spool shaft. For rewinding, the second motor is operated in reverse and the second planetary gearing mechanism is automatically disconnected from the winding spool and connected to the spool shaft of the film cartridge. In a second embodiment, the first motor and the first planetary gearing mechanism are employed to drive the spool shaft of the film cartridge in a film supply direction or a film rewind direction, and the second motor and the second planetary gearing mechanism are only used to drive the winding spool in a film winding direction.

6 Claims, 13 Drawing Sheets

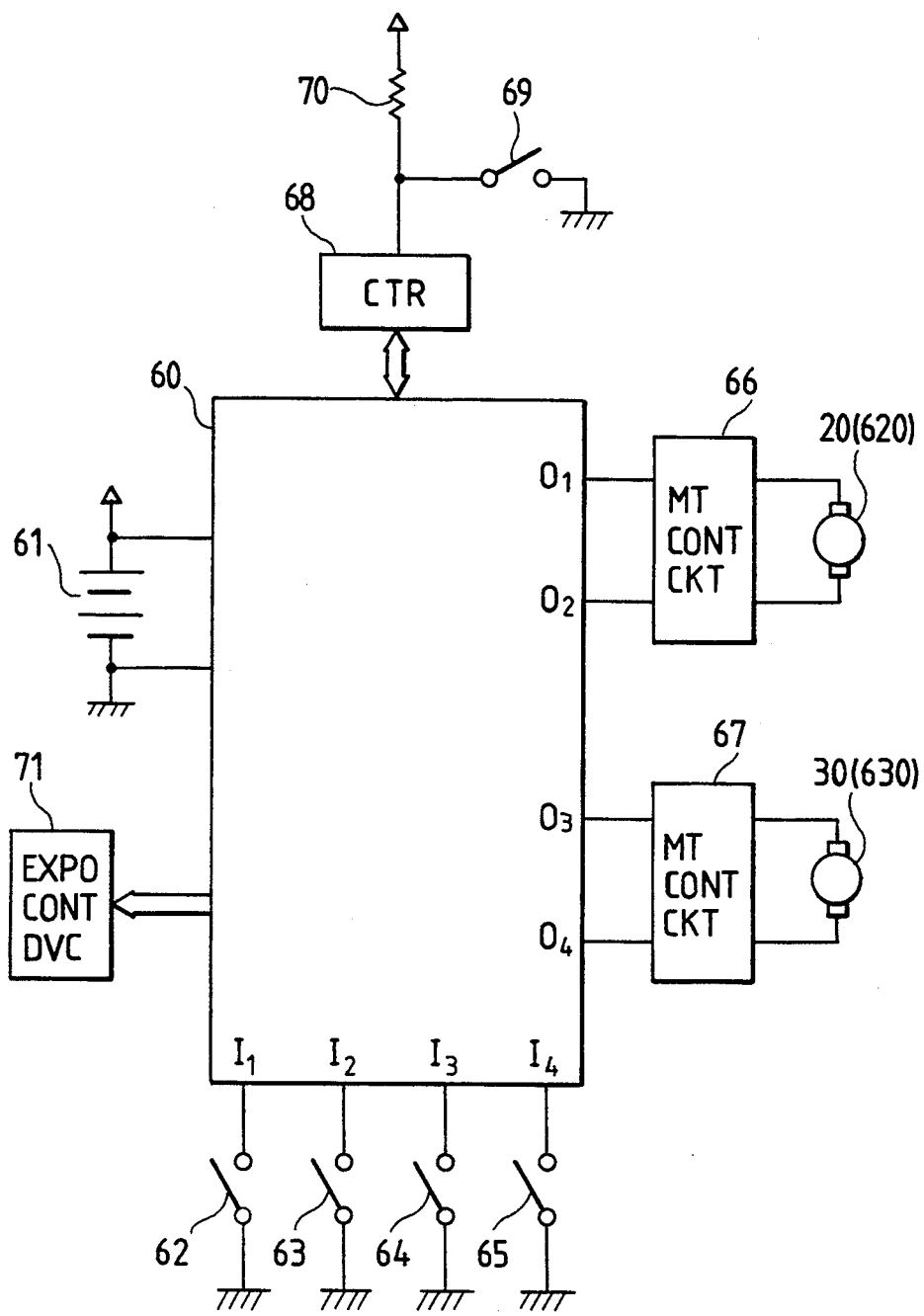

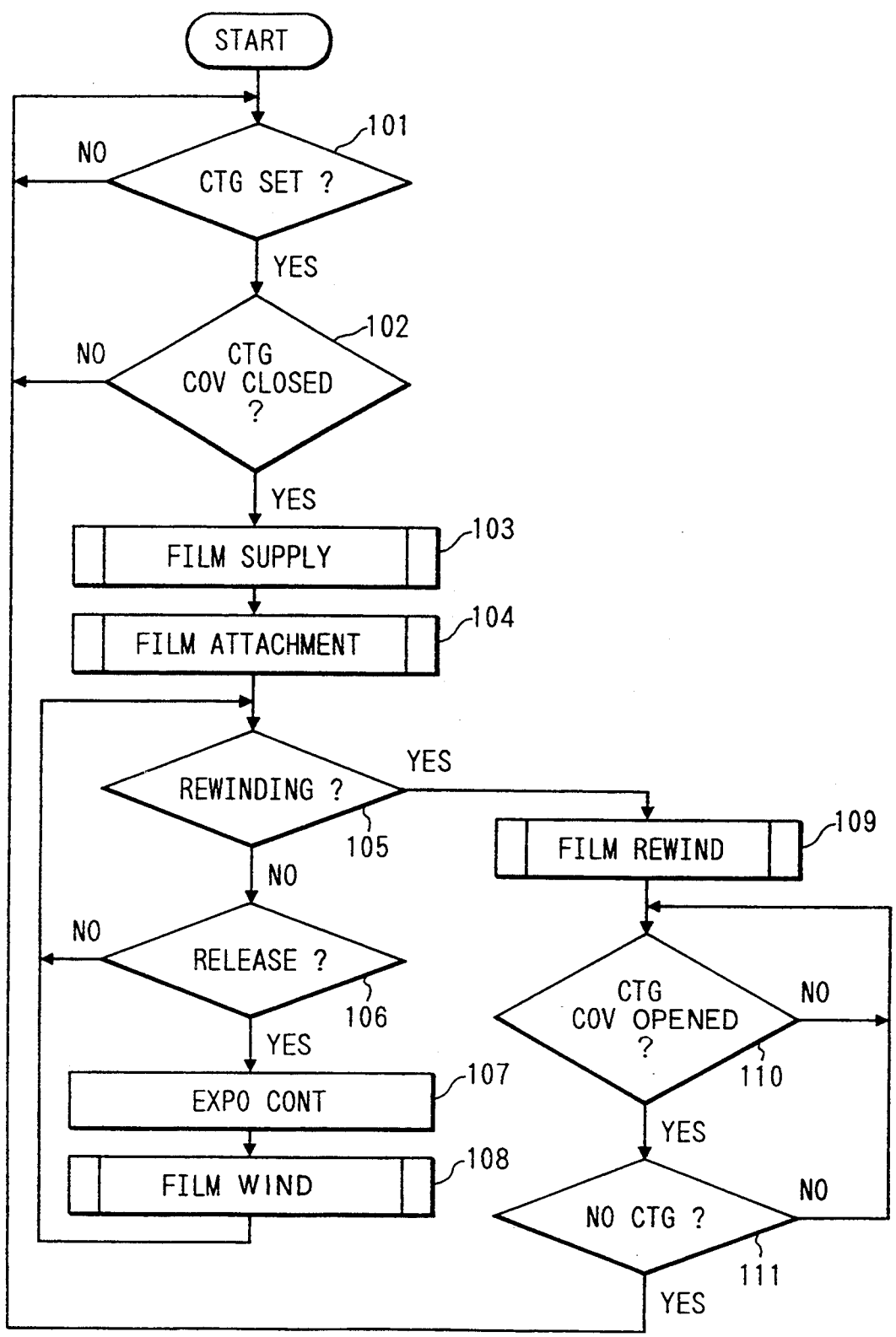

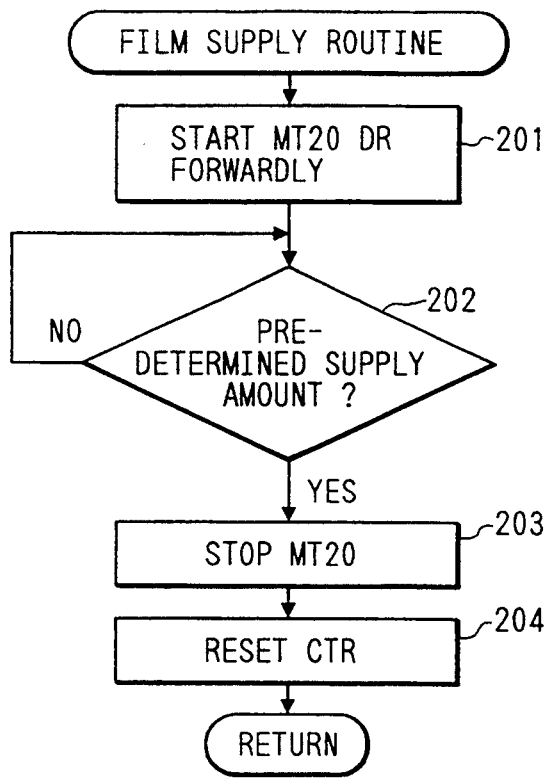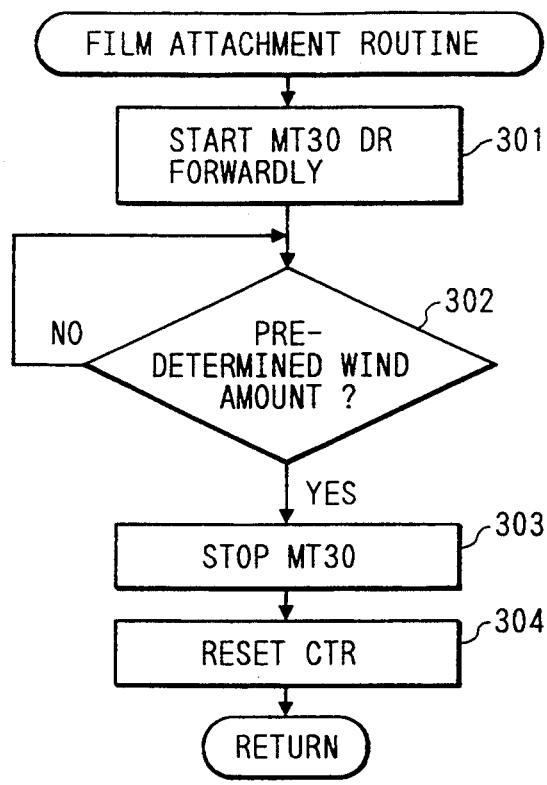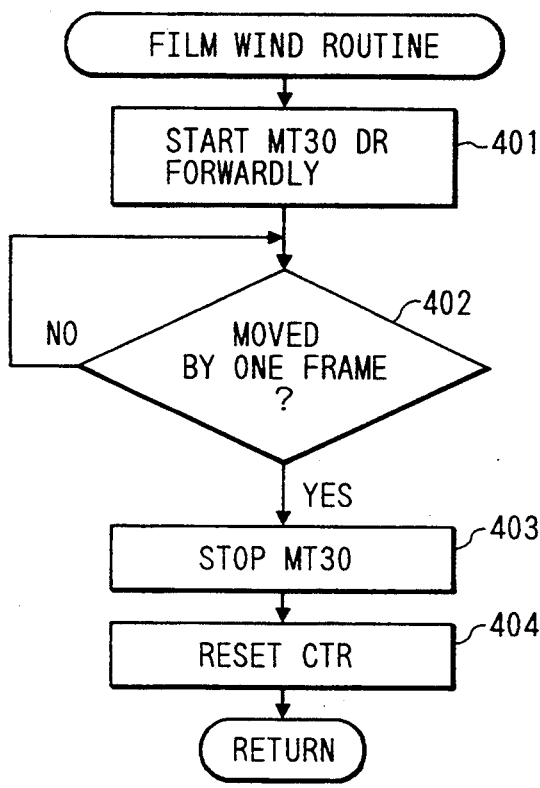

000
FILM FEEDING DEVICE FOR CAMERA

This is a continuation of application Ser. No. 08/236,152 filed May 2, 1994, which is a continuation of application Ser. No. 08/144,618 filed Nov. 1, 1993, which is a continuation of application Ser. No. 07/620,614 filed Dec. 3, 1990, all now abandoned.

BACKGROUND OF THE INVENTION

1. Field of the Invention

The present invention relates to a film feeding device for a camera into which is loaded a film cartridge arranged to feed or supply a film wound into the roll form therein outwardly through a supply outlet by rotating a spool shaft in the supply direction, and to rewind the film by rotating the spool shaft in the rewinding direction.

2. Related Background Art

As disclosed in U.S. Pat. No. 4,832,275, for example, and as shown schematically in FIG. 10, there has heretofore been proposed a film cartridge 2 comprising a tubular portion 2a for accommodating a photographic film 1 and having a spool shaft therein around which the film is wound in the roll form, and a film feed-out portion 2b provided integrally with the tubular portion 2a to extend in the tangential direction therefrom for accommodating a leading end of the film in the straight form. According to that cartridge 2, the film 1 is progressively fed out from its leading end through a supply outlet at a distal end of the feed-out portion 2b by driving the spool shaft disposed in the tubular portion 2a at its shaft end (i.e., a spline indicated by 2c in the drawing) to rotate in the supply direction of the film 1 (i.e., in the forward direction as indicated by the solid arrow in the drawing), whereas the film 1 is rewound by driving the spool shaft in the rewinding direction (i.e., in the backward direction as indicated by the broken arrow in the drawing), so that the film leading end may be returned into the feed-out portion 2b. Note that in this example, perforations 1a, 1a are successively formed in the upper and lower edge portions of the film 1, respectively, as with a 135 type film.

With such a cartridge structure, the leading end of the film 1 is held withdrawn into the cartridge 2 when the cartridge is loaded or set in a camera, or when the film is rewound to remove the cartridge out of the camera after the completion of photographing. Furthermore, because the film 1 can be automatically fed out with the spool shaft driven by an electric motor to carafe, a setting operation of the film 1 into the camera become, so very simple that a user may easily handle tile film 1.

However, no prior art has yet disclosed practical examples relating to camera structures and their internal mechanisms capable of loading the above type cartridge 2, in particular, relating to which mechanism is to be employed to feed the film 1 out of the cartridge 2, wind it frame by frame, and then rewind it into the cartridge 2. It is therefore desirable to realize a camera equipped with a supply mechanism, a winding mechanism, a rewinding mechanism for a film, etc., which can make full use of advantages of the cartridge structure as explained above.

In realizing such a desired camera, what is especially required is to supply, wind and rewind the film by a film driving mechanism with the necessary minimum number of parts and a simple structure. It is also required to arrange respective mechanism components with high efficiency, and construct the entire structure in small and compact size. Another requirement is to operate the respective mechanism components in a stable and reliable manner. Thus, some steps for meeting all of those requirements must be taken.

One of the problems encountered in such a film feeding device for a camera is the relationship between a supply drive system for feeding the film 1 out of cartridge 2 and a winding drive system for taking up the film 1. More specifically, the film supply drive system is operatively coupled to the spool shaft of the cartridge 2 for rotating the film 1 in the supply direction, whereas the film winding drive system is operatively coupled to a winding spool driven to attach and wind the film leading end around the spool, so that the film 1 is given 9 pulling force and taken up frame by frame. These two drive systems are interconnected through the film 1 and the spool shaft of the cartridge 2, and are arranged to provide respective rotations in the same direction. For simplification, it is preferable to operate both the drive systems by using a single drive source for rotation. But, the constructive arrangement necessary to operate the cartridge 2 and the winding spool disposed on opposite sides by using the single drive source is likely to complicate, taking into account the relationship of the above two drive systems anti a rewinding drive system as well. For this reason, the two drive systems are desirably driven by respective drive sources separate from each other. This, however, requires intricate control such as properly controlling the timings in respective operations to avoid mutual interference between the two drive systems, and also makes the structure more complicated. It is thus desired to be able to solve those points.

In addition, the problem faced in arranging the drive systems for supplying, winding and rewinding the film 1 raises a requirement to dispose the constituent elements the respective systems at locations out of interference with a film passage defined in an aperture section through which a beam of light is projected onto the film 1 for photographing. There are sometimes not left sufficient spaces above and below the film passage. These points must also be taken into consideration.

SUMMARY OF THE INVENTION

An object of the present invention is to provide a film feeding device for a camera which has a simple arrangement and is easy in control.

To achieve the above object, a film feeding device for a camera according to one aspect of the present invention comprises a film supply electric motor for rotating a spool shaft of a film cartridge in the supply direction, a torque transmission gear train for transmitting torque produced by the motor, a film drive gear located as a final stage of the gear train and having torque transmission means engaged with the spool shaft when the cartridge is loaded, a winding spool around which the supplied film is attached and which takes up the film in the supply direction upon winding rotation, and sensor means for detecting attachment of the film around the spool and stopping rotation of the supply motor in response to the detection, wherein a planet gear rotatable about its axis and around a sun gear driven by a gear on the motor side is disposed midway of the supply gear train in such a manner as to angularly move in the direction of coming into mesh with a driven gear on the drive gear side upon rotation transmitted from the motor side, and in the direction of coming out of mesh with the driven gear upon rotation of the drive gear produced by film winding.

With this aspect of the present invention, the planet gear disposed midway of the supply gear train with the sun gear driven by the motor side gear is angularly moved upon rotation of the motor to be meshed-with the driven gear on the drive gear side when the film is fed out of the cartridge, thereby supplying the film with the torque produced by the motor. Under a condition that supply of the film is completed and the motor is stopped after attachment of the film around the winding spool, the drive gear is rotated upon winding of the film so that the planet gear is angularly moved in the direction of coming out of mesh with the driven gear due to the difference in rotational speeds between the driven gear and the motor side gear. As a result, the film supply motor is automatically disconnected from the drive gear for the cartridge.

Further, a film feeding device for a camera according to another aspect of the present invention comprises a film supply/rewind electric motor for supplying a film from a supply outlet and rewinding the film into the supply outlet by driving a spool shaft of a film cartridge to rotate forwardly and backwardly, a planet gear of a planetary gear mechanism meshing with a sun gear, which is driven by the supply/rewind motor to rotate, and angularly moved around the sun gear between first and second angularly moved positions, torque transmission gears for supplying and rewinding the film which are arranged to be meshed with the planet gear at the first and second angularly moved positions, respectively, a film drive gear coupled to those supply and rewind gears and driven to rotate forwardly and backwardly for rotating the spool shaft, a winding spool for taking up the film supplied from the cartridge, and a film wind electric motor for driving the winding spool to rotate.

With this aspect of the present invention, as a common element of the torque transmission systems for transmitting the torque from the film supply/rewind motor to the supply gear and the rewind gear both coupled to the film drive gear for rotating the spool shaft of the cartridge, the planet gear of the planetary gear mechanism is employed which is held in mesh with the sun gear driven by a motor side gear to be angularly moved around the sun gear to the first and second angularly moved positions. By making the planet gear meshed with the supply gear at the first angularly moved position to rotate the drive gear forwardly, the film can be supplied from the cartridge. By making the planet gear meshed with the rewind gear at the second angularly moved position to rotate the drive gear backwardly, the film can be rewound into the cartridge. With this aspect, in particular, the drive system for supplying and rewinding the film is disposed on one side of the camera independently of the drive system for winding the film which is disposed on the other side of the camera, and comprises the wind motor driven to rotate the winding spool and the associated torque transmission system. There is thus no need of arranging a torque transmission system or the like while bypassing the aperture section of the camera along the upper or lower side thereof. This permits it to achieve effective utilization of space, including the upper and lower sides of the aperture section, and provide the structure arranged with high efficiency. In addition, the film can be properly supplied, taken up and rewound in desired conditions.

BRIEF DESCRIPTION OF THE DRAWINGS

FIG. 4 is a circuit block diagram for operating the device;

FIGS. 5 through 9 are flowcharts for explaining the operations of the device;

FIGS. 11 through 14 are schematic perspective views of a principal arrangement showing another embodiment of the film feeding device according to the present invention in which; FIG. 11 is a view showing an operation of supplying a film, FIGS. 12 and 13 are views showing an operation of winding the film, and FIG. 14 is a view showing an operation of rewinding the film, respectively.

DETAILED DESCRIPTION OF THE PREFERRED EMBODIMENTS

Figure 1:
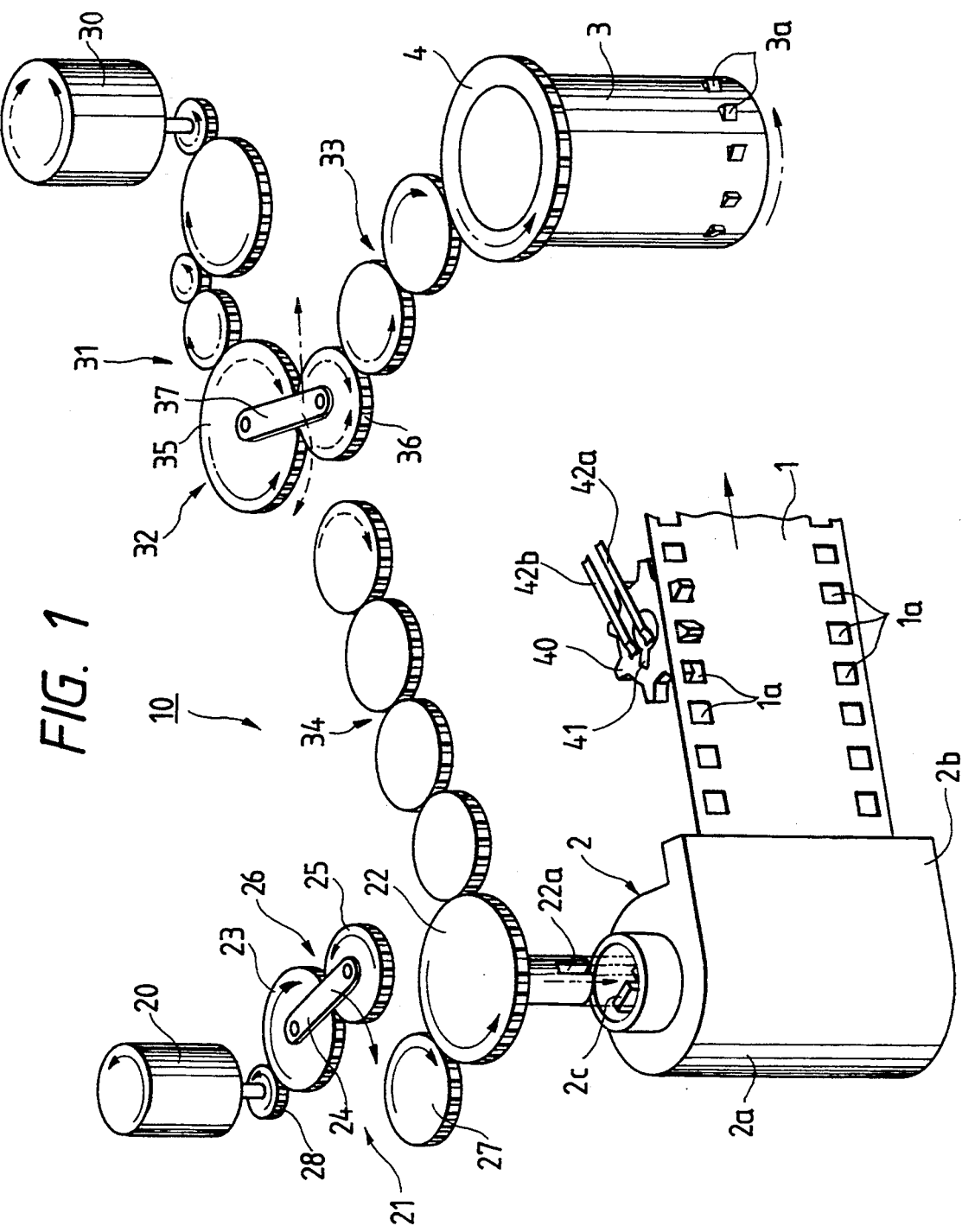
FIG. 1 is a schematic perspective view of a principal arrangement showing one embodiment of a film feeding device according to the present invention.

Hereinafter, the present invention will be described in detail with reference to preferred embodiments shown in the drawings.

Figure 2:
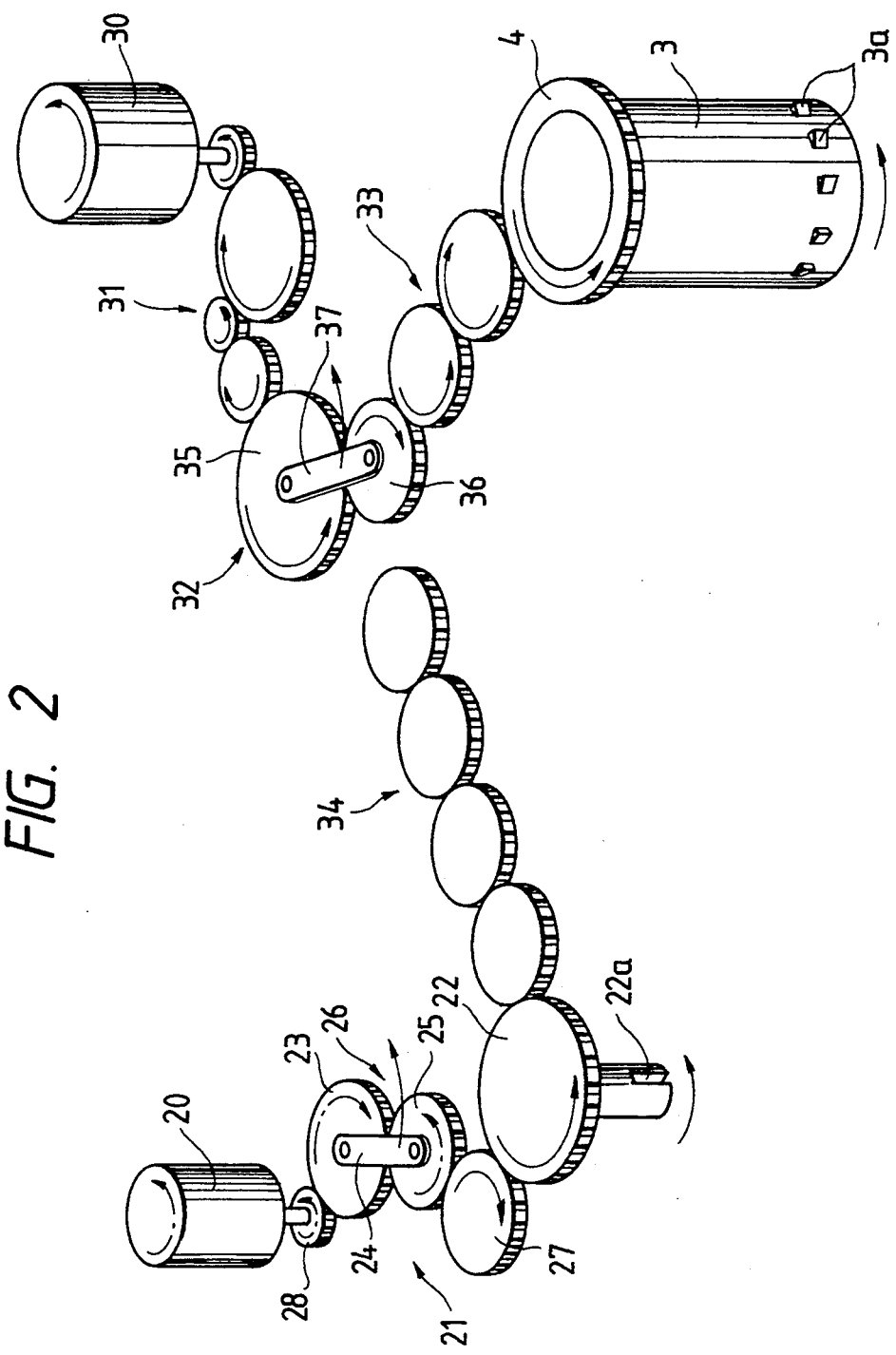
FIGS. 2 and 3 are similar schematic perspective views for explaining operations of supplying and winding a film and of rewinding the film, respectively.
Figure 3:
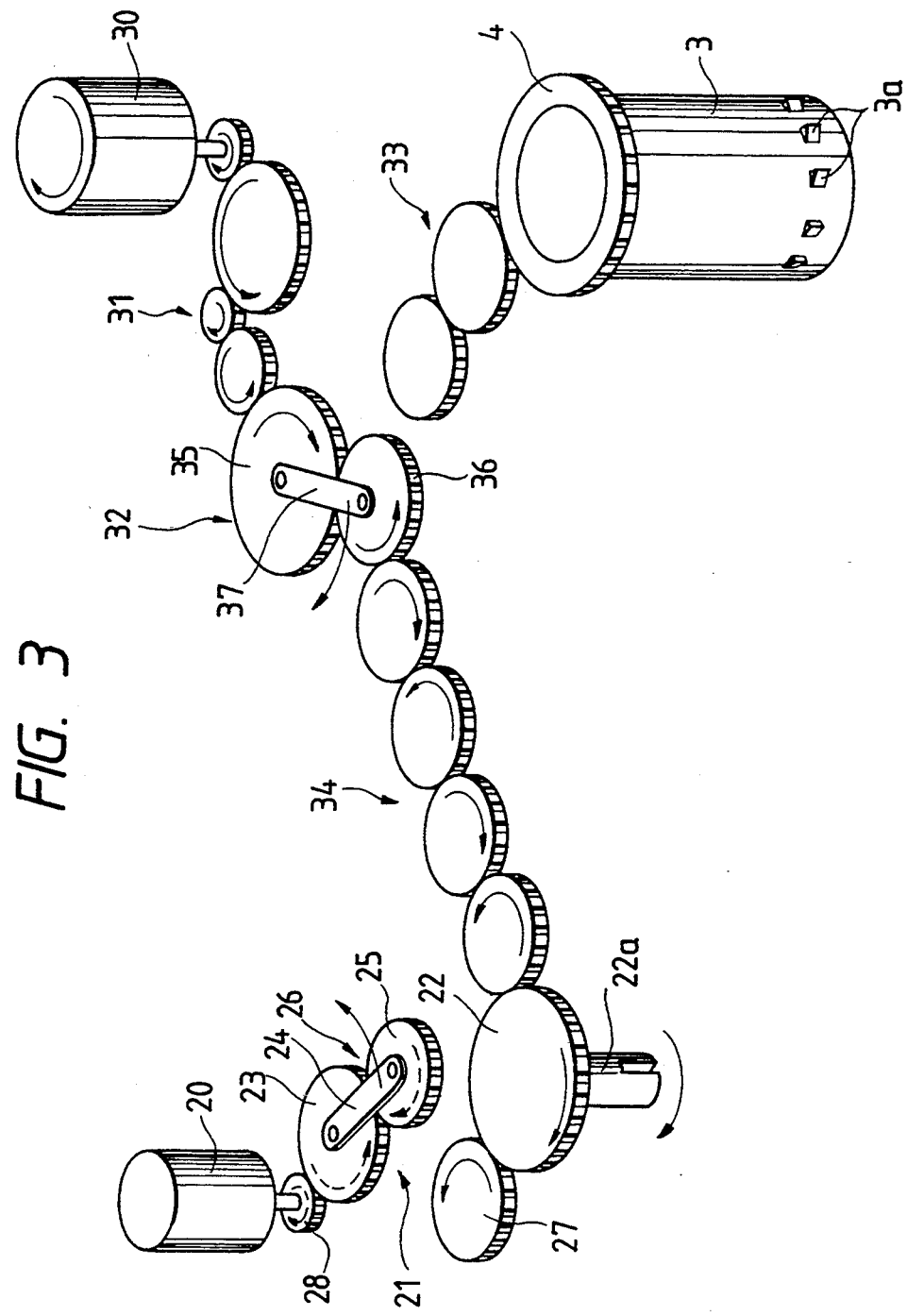
Figure 10:
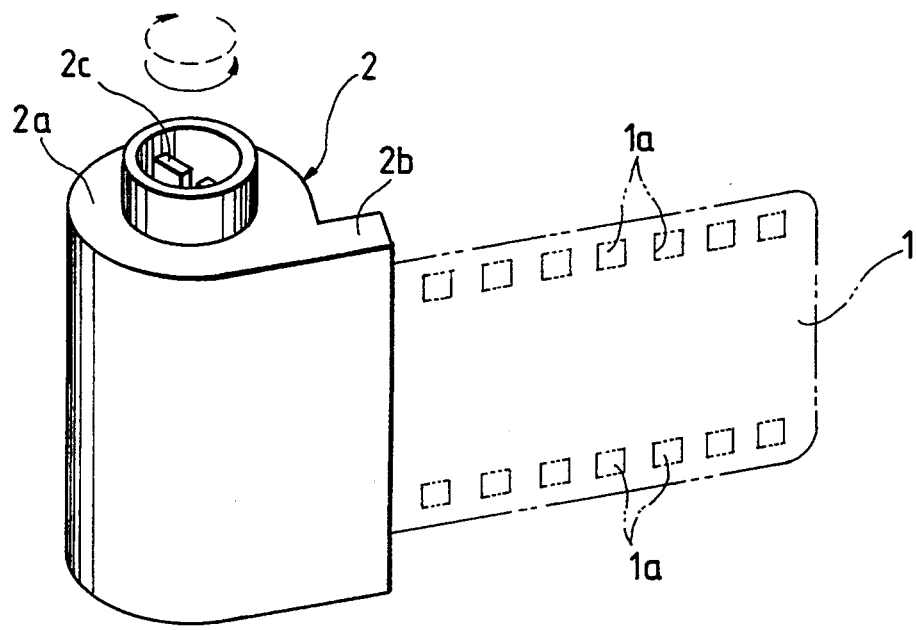
FIG. 10 is a schematic perspective view of a film cartridge for use in the present invention.

FIGS. 1 through 3 illustrate one embodiment of a film feeding device according to the present invention. The same parts in these drawings as those in FIG. 10 mentioned above relating to the prior art are denoted by the same reference numerals and their explanations are omitted here. Denoted by 3 in the drawings is a film winding spool disposed, along with a cartridge 2, within a camera body (not shown) in laterally spaced opposite relation. The film winding spool 3 is provided on its outer peripheral surface with a plurality of pawls 3a projecting to be engaged with perforations 1a formed in a film 1, and is also integrally provided with a winding spool drive gear 4 to which torque is transmitted to rotate it in the direction of taking up the film during the film winding operation, so that the film 1 is caused to run in the supply direction for taking-up thereof.

A film feeding device generally denoted by reference numeral 10 has two electric motors 20, 30 as drive sources, and is arranged to feed the film 1 out of the cartridge 2 by a predetermined amount, attach a leading end of the film 1 around the winding spool 3, and then take up the film 1 frame by frame upon rotation of the winding spool 3. After the completion of photographing, the spool shaft of the cartridge 2 is rotated backwardly to rewind the film 1 into the cartridge 2. Moire specifically, the first electric motor 20 is used as a drive source for supplying the film, and transmits torque in the supply direction of the film through a torque transmission gear train 21 for supplying the film (described later) to a film drive gear 22 which has a film drive key 22a engaged with a spline 2c to rotate the spool shaft of the cartridge 2 and serves as the final stage of the gear train 21, thereby supplying the film 1 when the cartridge 2 is loaded in a camera. While FIG. 1 shows a state in which the film drive key 22a of the drive gear 22, as means for transmitting torque to the spool shaft, is not engaged with the spline 2c, the film drive key 22a is actually so extended in the axial direction, as indicated by imaginary lines in the drawing, that the film drive key 22a comes into engagement with the spline 2c when the cartridge 2 is loaded in the camera.

Denoted by 40 is a free sprocket, as means for detecting an amount of the film moved, which is disposed to be engaged with perforations 1a in the upper side of the film 1 fed out through a supply outlet of the cartridge 2. Thus, a supply amount of the film 1 is detected from a rotation amount of the sprocket 40. More specifically, a conductor pattern 41 is formed on the upper surface of the sprocket 40, and a pair of brushes 42a, 42b come into or out of contact with the pattern 41 upon rotation of the sprocket 40, whereby the rotation amount of the sprocket 40, i.e., the movement amount of the film 1, is detected. It will be easily understood that the movement amount of the film 1 can be determined by arranging one brush 42a to be contacted with the pattern 41 at all times, arranging the other brush 42b to be contacted with the pattern 41 once for each rotation of the sprocket 40, and then detecting and processing off signal resulting from such a film movement sensor switch. Note that al though the illustrated embodiment shows the case of issuing one pulse for each rotation of the sprocket, the conductor pattern may be of course be modified into such a shape as issuing a plurality of pulses per rotation.

After passing the sprocket 40, the film 1 fed out of the cartridge 2 travels through a known film passage, usually called a tunnel, formed by inner and outer rails and a film pressing plate (all not shown). Then, after passing an aperture section, which defines a photographing screen, midway of the film passage, the film 1 reaches the outer periphery of the winding spool 3 against which the film 1 is held by a press roller with a biasing spring (not shown). This state is detected by sensor means associated with the sprocket 40. In response to the detection, the film supply motor 20 is stopped, whereas the winding spool 3 is driven to rotate in the winding direction (i.e., in the direction as indicated by the imaginary arrow in FIG. 1). Accordingly, the spool pawls 3a are brought into engagement with the perforations 1a in the lower side of the film 1 under the pressing action of the press roller, so that the film 1 is progressively taken up around the spool 3 to perform winding of the film 1, i.e., pulling-out of the film 1 from the cartridge 2, in a successive manner. Note that the film supply motor 20 may be stopped as appropriate after the winding spool 3 has been driven to rotate in the winding direction.

The winding spool 3 is driven with torque produced by the second motor 30, the torque being transmitted through a torque transmission gear train 31, a planetary gear mechanism 32 serving as a final stage of the gear train 31 and capable of selecting the meshing directions, i.e., selecting gears to be meshed therewith, and a torque transmission train 33 for winding the film, to the drive gear 4 integral with the spool 3 for performing the film winding operation (see FIG. 2). Whether the film 1 has been attached around the winding spool 3 or not and a feed amount of the film 1 per frame can be determined by applying an output of the switch, which comprises the conductor pattern 41 on the sprocket 40 and the pair of brushes 42a, 42b, to an arithmetic circuit, and then calculating the feed amount of the film 1.

After the completion of photographing, the film can be rewound by rotating the drive gear 22 in the direction opposite to the supply direction so that the spool shaft is rotated through the engagement between the film drive key 22a and the spline 2c in the direction opposite to that in the reel-out or supply operation. In this embodiment, the second motor 30 is used as a common drive source for winding and rewinding the film. By rotating the motor 30 in the direction opposite to that in the winding operation, and shifting the planetary gear mechanism 32 from the position shown in FIGS. 1 and 2 to be meshed with a torque transmission gear train 34 for rewinding the film as shown in FIG. 3, the torque produced by the motor 30 is transmitted to the drive gear 22 operatively coupled to the spool shaft, for thereby rewinding the film.

The planetary gear mechanism 31 for selectively transmitting the torque from the motor 30 for winding and rewinding the film 1 to the winding gear train 33 or the rewinding gear train 34 comprises a sun gear 35 driven by a final stage gear of the torque transmission gear train 31 coupled to the motor 30, a planet gear 36 in mesh with the sun gear 35 to rotate about its axis and around the sun gear 35, and a lever arm 37 pivotally supported to the sun gear 35 in coaxial relation while being given with frictional resistance by a friction spring (not shown), and having a free end to which the planet gear 36 is pivotally supported. As the lever arm 37 is caused to angularly move with the action of the frictional resistance and torque upon rotation of the sun gear 35 in the same direction, the planet gear 35 is selectively meshed with the winding gear train 33 or the rewinding gear train 34 to transmit the torque in the desired direction. The relationship between the rotating direction of the motor 30 and the gear train 33 or 34 to be meshed with the planet gear 36 can be easily understood from the wind state shown in FIG. 2 and the rewind state shown in FIG. 3. The meshed condition of the planet gear 36 with the winding or rewinding gear train 33 or 34 is maintained with the lever arm 37 held at one of angularly moved opposite positions due to continued rotation of the sun gear 35 to which the torque is transmitted from the motor 30.

In addition to the above arrangement of the film feeding device 10, the present invention has a feature as follows. Midway of the torque transmission gear train 21 for transmitting torque from the film supply motor 20 to the film drive gear 22, there is provided a planetary gear mechanism 26 comprising a sun gear 23 driven by a gear 28 coupled to the motor 20, a planet gear 25 in mesh with the sun gear 23 to rotate about its axis and around the sun gear 23, and a lever arm 24 pivotally supported to the sun gear 23 in coaxial relation while being driven with frictional resistance by a friction spring (not shown), and having a free end to which the planet gear 25 is pivotally supported. As the motor 20 is driven to produce torque for supplying the film and the lever arm 24 is caused to angularly move with the action of the frictional resistance and torque upon rotation of the sun gear 23 in the same direction, the planet gear 25 is meshed with a driven gear 27 adjacent to the film drive gear 22. After the completion of supply of the film 1 and stop of the motor 20, when the film 1 is taken up by the winding spool 3, the lever arm 24 is caused to angularly move in the direction of making the planet gear 25 out of mesh with the driven gear 27 upon rotation of the film drive gear 22 owing to the difference in rotational speeds between the film drive gear 22 and the motor side gear (the sun gear 23 or the gear 28 in mesh with the sun gear). In this connection, even with the motor 20 being not stopped, as the film 1 is taken up by the winding spool 3, the film drive gear 22 is rotated to cause the lever arm 24 to angularly move in the direction of making the planet gear 25 out of mesh with the driven gear 27 owing to the difference in rotational speeds between the film drive gear 22 and the motor side gear (the sun gear 23 or the gear 28 in mesh with the sun gear).

Stated otherwise, when the motor 20 is rotated in the direction indicated by the solid arrow in FIG. 1, the lever arm 24 is angularly moved upon rotation of the sun gear 23, whereupon the planet gear 25 is meshed with the driven gear 27 as shown in FIG. 2. Through these gears 25 and 27 being held meshed with each other, the drive gear 22 is driven to rotate in the film supply direction so that the film 1 is fed out of the cartridge 2. The supply amount of the film 1 is successively detected by the sensor means constituted by the sprocket 40 to detect the time when the leading end of the film 1 reaches the outer periphery of the winding spool 3 to be capable of being attached around or taken up by the winding spool. In response to the detection, the supply motor 20 is brought to stop rotating, whereas the film winding drive system is driven by the motor 30 to rotate, as explained above.

At such a start of the film winding operation, when the supply motor 20 is stopped and, simultaneously, the winding spool 3 is rotated to take up the film upon rotation of the wind motor 30, the film supply drive system and the film winding drive system in the positional relationship as shown in FIG. 2 now operate as follows. Specifically, when the film 1 is attached around and taken up by the winding spool 3 upon rotation of the spool 3, the film 1 is subjected to pulling force in the film supply direction, whereby the spool shaft in the cartridge 2 is rotated with the winding operation, This rotation of the spool shaft causes the drive gear 22 to rotate in the film supply direction, so that the driven gear 27 is also rotated as indicated by the solid arrow in FIG. 2. In this state, because the supply motor 20 is stopped, the planet gear 25 is automatically moved through the lever arm 24 in the direction of coming out of mesh with the driven gear 27 as indicated by the solid arrow in FIG. 2 owing to the difference in rotational speeds between the driven gear 27 and the motor side gears 23, 28. The planet gear 25 is stopped in a position out of mesh with the driven gear 27 to disconnect the supply motor 20 from rotation of the drive gear 22. This state corresponds to the positional relationship shown in FIG. 1. It can be easily understood that the film is taken up successively in such state as explained above. Furthermore, it is desirable that a stop for restricting movement of the planet gear 25 be provided at the position where the planet gear 25 becomes out of mesh with the driven gear 27, while reserving some allowance.

Even with the motor 20 being not stopped, if the speed at which the film is taken up by the motor 30 is higher than the speed at which the film is fed out by the motor 20, the planet gear 25 is moved away from the driven gear 27 owing to the difference in rotational speeds between the driven gear 27 and the motor side gears 23, 28, to thereby disconnect the supply motor 20 from rotation of the drive gear 22.

With the arrangement explained above, in the operations of supplying and winding the film 1, the torque transmission gear train 21 is automatically connected and disconnected between the supply motor 20 and the drive gear 22 upon movement of the planet gear 25 of the planetary gear mechanism 26 by making use of the rotation transmitted from the motor 20 and the rotation transmit ted from the drive gear 22, respectively. There can thus be obtained the advantage that both the supply and winding drive systems are driven in desired conditions without needing intricate control despite the simple structure.

In the above arrangement, when the film 1 is taken up a predetermined number of frames and the sprocket 40 detects the completion of photographing, the motor 30 is controlled such that its rotation is reversed from the direction indicated by the solid arrow to the direction indicated by the broken arrow in FIG. 1. The planetary gear mechanism 32 is thereby switched from the film winding state shown in FIG. 1 to the film rewinding state shown in FIG. 3 so as to start an operation of rewinding the film 2 into the cartridge 2. When the film 1 is rewound until the sprocket 40 is not engaged with any perforations 1a in the film 1, the aforesaid film movement sensor switch can no longer issue the on/off pulse signal, enabling it to detect the state that the film is rewound to the position of the sprocket 40. After continuing to rotate the motor 30 for a predetermined period of time from that state, the motor 30 is stopped at the timing when the film 1 has been certainly rewound into the cartridge 2, whereby the rewinding operation is completed.

After the completion of the film winding operation, the planet gear 25 of the planetary gear mechanism 26 associated with the supply motor 20 may be meshed with the driven gears 27 on rare occasions. If such an event happens, since the drive gear 22 is rotated in the direction opposite to the supply direction for rewinding the film as the motor 30 is rotated in the rewinding direction, torque is transmitted from the driven gear 27 to the planet gear 25 in such a rotational direction that the lever arm 24 of the sun gear 23 is angularly moved to keep the planet gear 25 meshed with the driven gear 27. Then, the rotation of the planet gear 25 is finally transmitted to the motor 20 through the sun gear 23 and the gear 28, thereby impeding the film rewinding operation. Specifically, in such an event, the motor 20 is rotated by external forces and acts as a dynamo so that additional load is produced and applied to the motor 30. To avoid that trouble, it is desirable that prior to rotating the motor 30, the motor 20 is rotated backwardly as a preliminary step to displace the planet gear 25 to a position where it will remain out of mesh.

The above arrangement apparently has the advantage that the operations of supplying the film from the cartridge 2, winding it around the spool 3 and rewinding it into the cartridge can be performed properly and reliably by using the two motors 20, 30.

drive circuit and a control sequence for the film feeding device 10 arranged as explained above will now be described with reference to FIGS. 4 through 9.

FIG. 4 is a block diagram of the drive circuit for carrying out the respective operations. In the drawing, denoted by 50 is a microcomputer (hereinafter referred to as a CPU), 61 is a power supply battery, 62 is a cartridge sensor switch for detecting a loading of the cartridge 2 into the camera in interlock with motion of a sensor member (not shown), 63 is a cartridge cover sensor switch turned on by a sensor member (not shown) which is operated upon closing a cartridge cover after the cartridge 2 has been loaded, 64 is a release switch turned on in interlock with depressed motion of a release button (not shown), and 65 is a rewinding manual switch turned on in interlock with depressed motion of a rewinding manual button (not shown). These switches 62–65 are connected to input ports $I_1$–$I_4$ of the CPU 60, respectively.

Denoted by 66, 67 are motor control circuits for controlling the start and stop of rotations of the supply motor 20 and the wind/rewind motor 30, that are connected to output ports $O_1$; $O_2$; $O_3$; $O_4$ of the CPU 60, respectively. These motors 20, 30 are driven to rotate forwardly (i.e., in the directions of supplying and winding the film) when only ports $O_1$, $O_3$ take a high level, driven to rotate backwardly (i.e., in the direction of rewinding the film, etc.) when only the ports $O_2$, $O_4$ take a high level, and are stopped when both of the paired ports take a low level.

Denoted by 68 is a counter for counting output pulses of a film movement sensor switch 69, which comprises the conductor pattern 41 and the pair of brushes 42a, 42b and is turned on/off in interlock with the sprocket 40. The counter 68 outputs a counted value to the CPU 60, and the counted value is reset to zero in response to a command from the CPU 60. Further, denoted by 70 is a pull-up resistor for pulling up the brush 42b to the battery 61, the brush 42b serving as one end of the switch 69 to come into or out of contact with the conductor pattern 41 and being connected to the counter 68 as well.

Denoted by 71 is an exposure control device for the camera, including a shutter, an iris and an iris controller, to control a shutter speed and an iris opening in response to commands from the CPU 60.

With the above circuit arrangement, when the battery 61 is loaded into the camera, the CPU 60 starts execution of the program. As will be seen from FIG. 5, setting of the cartridge 2 into the camera is confirmed dependent on whether the cartridge sensor switch 62 is turned on or off (step 101). If the cartridge 2 is confirmed as being set, then a step 102 confirms whether the cartridge cover is closed or not with the aid of the cartridge cover sensor switch 63. In response to the confirmation of the cartridge cover as being closed, the film supply drive system is operated to feed the film i out of the cartridge 2 in a step 103.

This film supply step 103 is detailed in FIG. 6. In a step 201, the motor 20 is started to rotate forwardly (i.e., in the supply direction) through the motor control circuit 66 shown in FIG. 4 in response to a command from the CPU 60, thereby supplying the film 1. In a next step 202, the pulse signal issued from the switch 69 upon rotation of the sprocket 40 is integrated by the counter 68 to calculate a supply amount of the film 1, to thereby determine whether the film 1 has been supplied or not in a predetermined amount necessary for the film 1 to reach the winding spool 3. At the time the supply amount of the film reaches the predetermined one, the motor 20 is stopped in response to, a command from the CPU 60 for slopping the film supply operation in a step 203. Then, the counted value of the counter 68 is reset to zero in a step 204, followed by returning to the main program and proceeding to a step 104 in FIG. 5.

In the step 104, the winding spool 3 of the camera is rotated for attaching the film around the spool 3. This film attachment step is detailed in FIG. 7. In a step 301, the motor 30 is rotated forwardly in the winding direction through the motor control circuit 67 in response to a command from the CPU 60, thereby attaching and winding the film 1 around the spool 3. In a next step 302, whether the wind amount of the film 1 has reached a predetermined value or not is confirmed using the counter 68 in a like manner to the above. If the predetermined wind amount of the film is confirmed, the motor 30 is stopped (step 303) and the counter 68 is reset to zero (step 304), followed by returning to the main program and proceeding to a step 105 in FIG. 5.

In the step 105, whether the rewinding manual switch 64 is turned on or off is confirmed. In the absence of an instruction to rewind the film, the control flow proceeds to a step 106. The step 106 determines the presence or absence of a release action (i.e., an instruction of photographing). In a next step 107, film sensitivity from a film sensitivity setting device (not shown), brightness of a subject from a subject brightness setting device (not shown), etc. are introduced to calculate a shutter speed and an iris opening. Based on the calculated parameters, the exposure control device 71 is controlled to perform a series of steps for taking a photograph, Afterward, the film is wound or taken up frame by frame in a step 108. This film wind step 108 is detailed in FIG. 8.

More specifically, the film is wound by rotating the motor 30 forwardly in response to a command from the CPU 60 to rotate the spool 3 in a step 401 of FIG. 8. A next step 402 determines whether the movement amount of frame 1 has reached or not a value corresponding to one frame. Then, the motor 30 is stopped in a step 403 and the counter is reset to zero in a step 404, followed by returning to the step 105 in the main program. In this way, a sequence of taking photographs frame by frame will be repeated.

On the other hand, if an instruction to rewind the film is confirmed in the step 105, the film 1 which has been taken up around the spool 3 is rewound into the cartridge 2 in a step 109. After the completion of rewinding, determination is made as to whether the cartridge cover is opened or not (step 110), and then whether the cartridge 2 is present or absent (step 111). Removal of the cartridge 2 is thus confirmed, followed by returning to the initial step 101.

Figure 9:
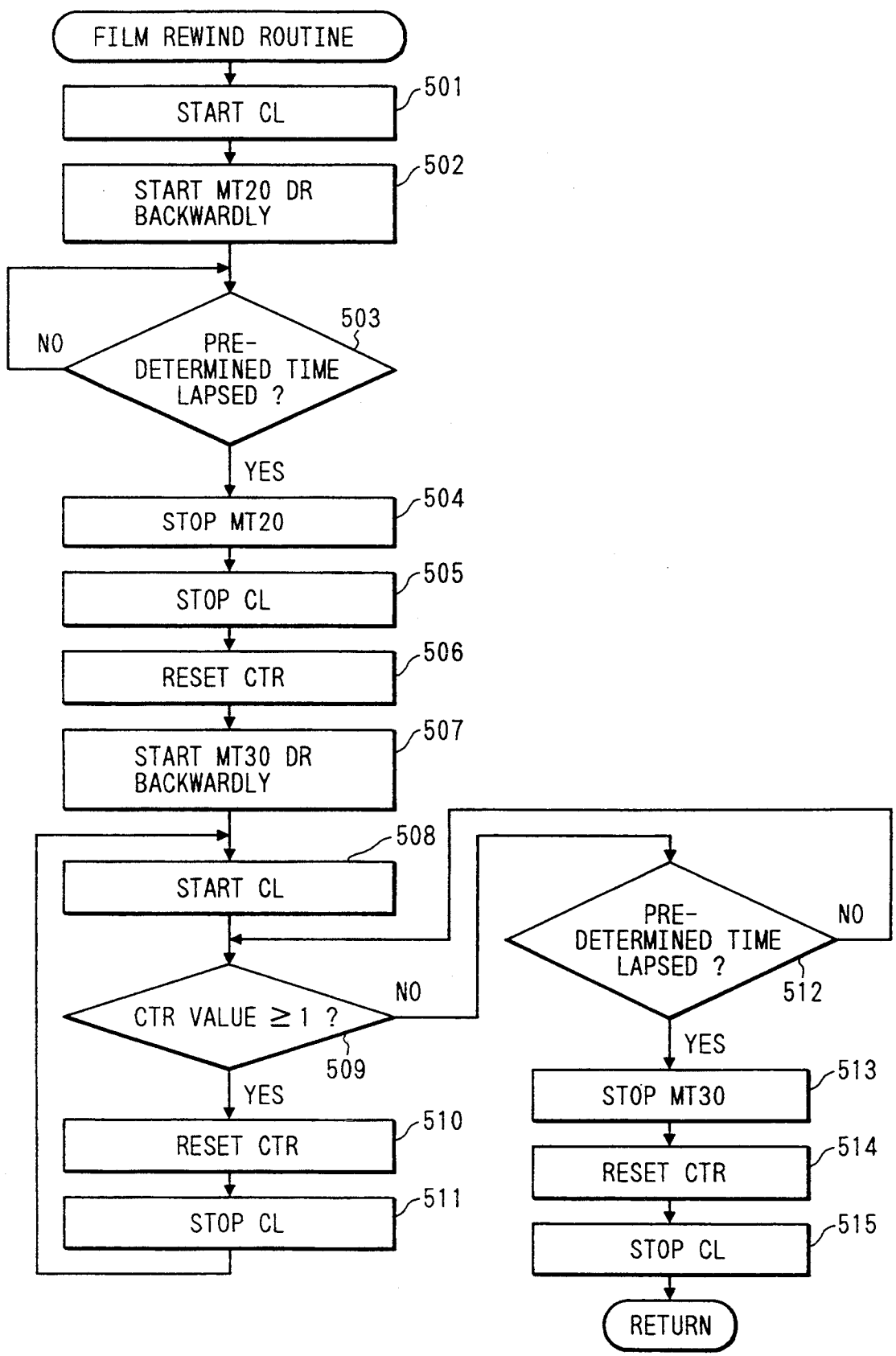

The above film rewind step is detailed in FIG. 9. Through steps 501–506, clocking (measurement) of time in which the supply motor 20 is rotated backwardly is first set to start; the supply motor 20 is rotated backwardly; whether predetermined time enough to certainly disconnect the planet gear 25 from the driven gear 27 in the supply drive system has lapsed or not during the backward rotation of the motor 20 is determined; the motor 20 is stopped; the time clocking is stopped; and then the counter is reset.

Next, as shown in steps 507–511, the rewind motor 30 is started to rotate backwardly and, at the same time, time clocking to determine whether the film is still moving or not is started. If the counted value is equal to or larger than 1, it is confirmed that the film is still moving or under rewinding. Then, the counted value is reset to zero and the time clocking is stopped, followed by returning to the step 508 to start the time clocking again.

Meanwhile, if the counted value is zero in the step 509, predetermined time is allowed to lapse in a step 512, thereby permitting further movement of the film for the complete rewinding. In other words, a period of time required to reel the film 1 from the position of the sprocket 40 into the cartridge 2 is reserved by lapse of the predetermined time. Afterward, through steps 513–515, the motor 30 is stopped, the counter is reset, and the time clocking is stopped, followed by return into to the step 110 in the main program. It will be easily understood that the film 1 is thus completely rewound into the cartridge 2.

Note that the present invention is not limited to the structure of this embodiment illustrated above, and configurations, structures, etc. of the respective components, including the arrangement of the film feeding device 10, can be optionally changed and modified as appropriate into a variety of modifications.

As described above, the film feeding device according to this embodiment of the present invention comprises a film supply electric motor for rotating a spool shaft of a film cartridge in the supply direction, a torque transmission gear train for transmitting torque produced by the motor, a film drive gear located as a final stage of the gear train and having torque transmission means engaged with the spool shaft when the cartridge is loaded, a winding spool around which the supplied film is attached and which takes up the film in the supply direction upon winding rotation, and sensor means for detecting attachment of the film around the spool and stopping rotation of the supply motor in response to the detection, wherein a planet gear rotatable about its axis and around a sun gear driven by a gear on the motor side is disposed midway of the supply gear train in such a manner as to angularly move in the direction of coming into mesh with a driven gear on the drive gear side upon rotation transmitted from the motor side, and in the direction of coming out of mesh with the driven gear upon rotation of the drive gear produced by film winding. Therefore, when the film is supplied, the planet gear of the supply gear train is angularly moved upon rotation of the supply motor itself to be meshed with the driven gear for enabling torque transmission to the drive gear. After the completion of supply of the film and subsequent stop of the motor, when the winding spool around which the leading end of the film has been attached is rotated to take up the film, the drive gear is also rotated so that the planet gear is angularly moved automatically in the direction of coming out of mesh with the driven gear. As a result, the planet gear is disconnected from the drive gear for the cartridge in an automatic manner. Consequently, it is possible to obtain various excellent advantages of implementing the film feeding operation properly and reliably when the film is supplied and taken up, simplifying arrangements of the respective components, and requiring no intricate motor control.

FIGS. 11 through 14 illustrate another embodiment of the film feeding device according to the present invention. The same parts in these drawings as those in FIG. 10 mentioned above relating to the prior art are denoted by the same reference numerals and their explanations are omitted here. Denoted by 603 in the drawings is a film winding spool disposed, along with a cartridge 2, within a camera body (not shown) in laterally spaced opposite relation. The film winding spool 603 is provided on its outer peripheral surface with a plurality of pawls 603a projecting to be engaged with perforations 1a formed in a film 1, and is also integrally provided with a winding spool drive gear 604 to which torque is transmitted to rotate it in the direction of taking up the film during the film winding operation, so that the film is caused to run in the supply direction for taking-up thereof.

Figure 11:
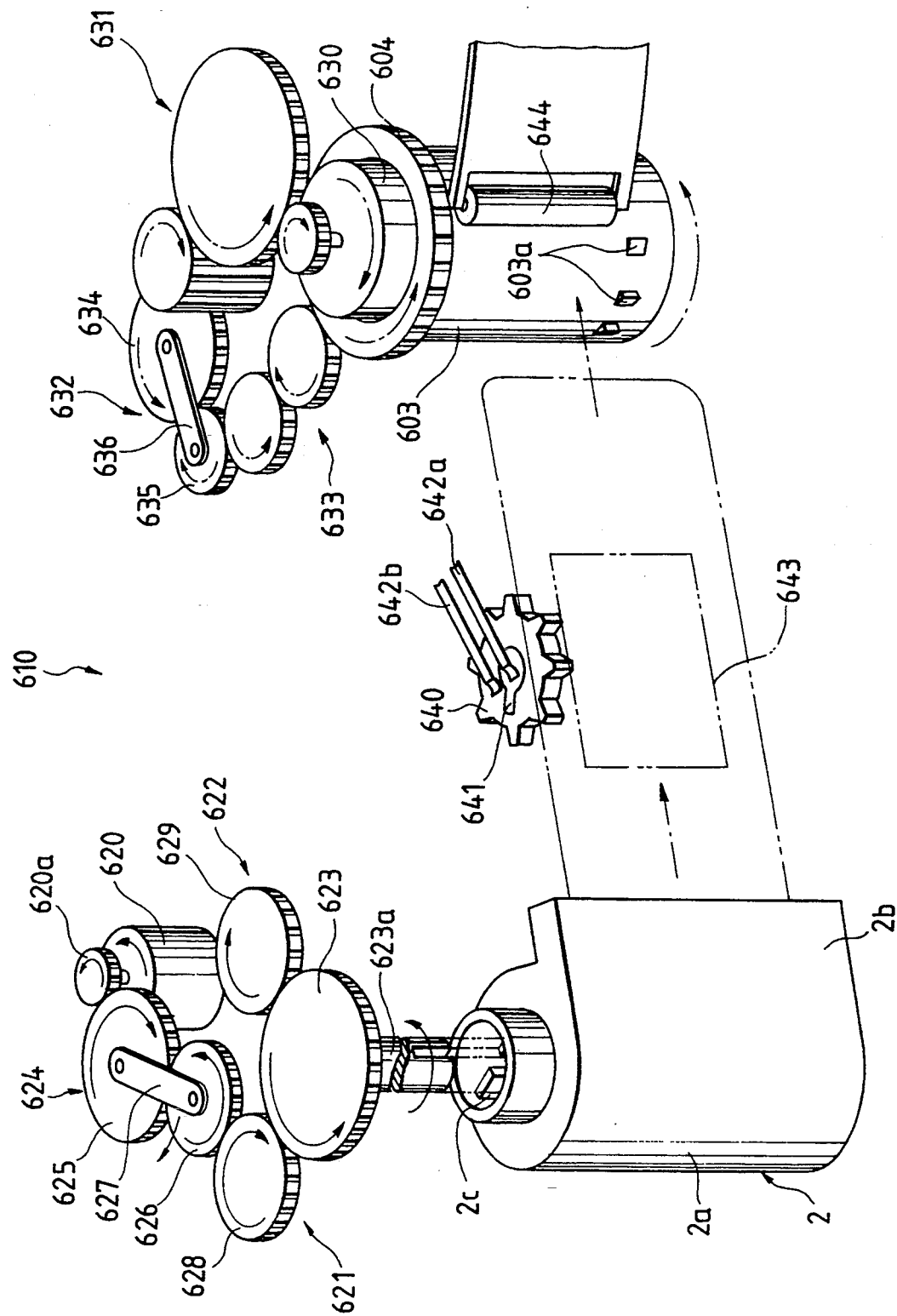

A film feeding device generally denoted by reference numeral 610 has two electric motors 620, 630 as drive sources, and is arranged to feed the film 1 out of the cartridge 2 by a predetermined amount, attach a leading end of the film 1 around the winding spool 603, and then take up the film 1 frame by frame upon rotation of the winding spool 603. After the completion of photographing, the spool shaft of the cartridge 2 is rotated backwardly to rewind the film 1 into the cartridge 2. More specifically, the first electric motor 620 is used as a drive source for supplying and rewinding the film, and transmits torque in the film supply (forward) direction or in the film rewinding (backward) direction through a torque transmission gear train 621 for supplying the film or a torque transmission gear train 622 for rewinding the film both described later) to a film drive gear 623 which has a film drive key 623a engaged with a spline 2c to rotate the spool shaft of the cartridge 2 forwardly of backwardly and serves as the final stage of the gear train 621 or 622, thereby supplying the film 1 when the cartridge 2 is loaded in a camera, or rewinding the film 1 after the completion of photographing. While FIG. 11 shows a state in which the film drive key 623a of the drive gear 623, as means for transmitting torque to the spool shaft, is not engaged with the spline 2c, the film drive key 623a is actually so extended in the axial direction, as indicated by imaginary lines in the drawing, that the film drive key 623a comes into engagement with the spline 2c when the cartridge 2 is loaded in the camera.

Denoted by 640 is a free sprocket, as means for detecting an amount of the film moved, which is disposed to be engaged with perforations 1a in the upper side of the film 1 fed out through a supply outlet of the cartridge 2, as shown in FIG. 2 and so forth. Thus, a supply amount of the film 1 is detected from a rotation amount of the sprocket 640. More specifically, a conductor pattern 641 is formed on the upper surface of the sprocket 640, and a pair of brushes 642a, 642b come into or out of contact with the pattern 641 upon rotation of the sprocket 640, whereby the rotation amount of the sprocket 640, i.e., the movement amount of the film 1, is detected. It will be easily understood that the movement amount of the film 1 can be determined by arranging one brush 642a to be contacted with the pattern 641 at all times, arranging the other brush 642b to be contacted with the pat tern 641 once for each rotation of the sprocket 640, and then detecting and processing an on/off signal resulting from such a film movement sensor switch. Note that although the illustrated embodiment shows the case of issuing one pulse for each rotation of the sprocket, the conductor pattern may be of course be modified into such a shape as issuing a plurality of pulses per rotation.

Figure 12:
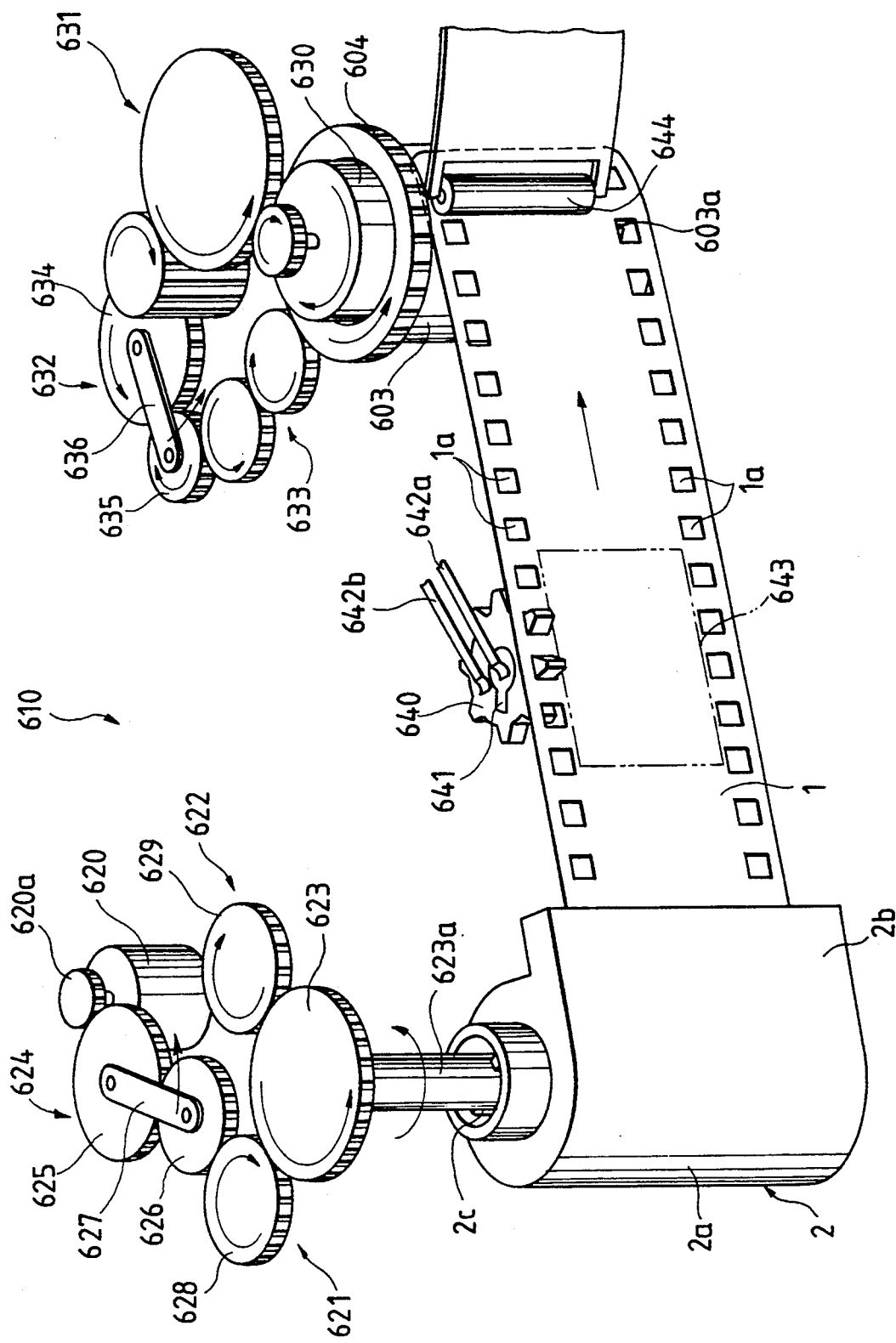

After passing the sprocket 640, as shown in FIGS. 12 and so forth, the film 1 fed out of the cartridge 2 travels through a known film passage, usually called a tunnel, formed by inner and outer rails and a film pressing plate (all not shown). Then, after passing an aperture section (643), which defines a photographing screen, midway of the film passage, the film 1 reaches the outer periphery of the winding spool 603 against which the film 1 is held by a press roller 644 being biased by a spring (not shown). This state is detected by sensor means associated with the sprocket 640. In response to the detection, the film supply/rewind motor 620 is stopped, whereas the winding spool 603 is driven to rotate in the winding direction (i.e., in the direction as indicated by the imaginary arrow in FIG. 11 and the solid arrow in FIG. 12). Accordingly, the spool pawls 603a are brought in to engagement with the perforations 1a in the lower side of the film 1 under the pressing action by the press roller 644, and the film 1 is progressively taken up around the spool 603, so that the film 1 is allowed to run and move in the direction indicated by the solid arrow in FIG. 12 to perform winding of the film 1, i.e., pulling-out of the film i from the cartridge 2, in a successive manner.

Figure 13:
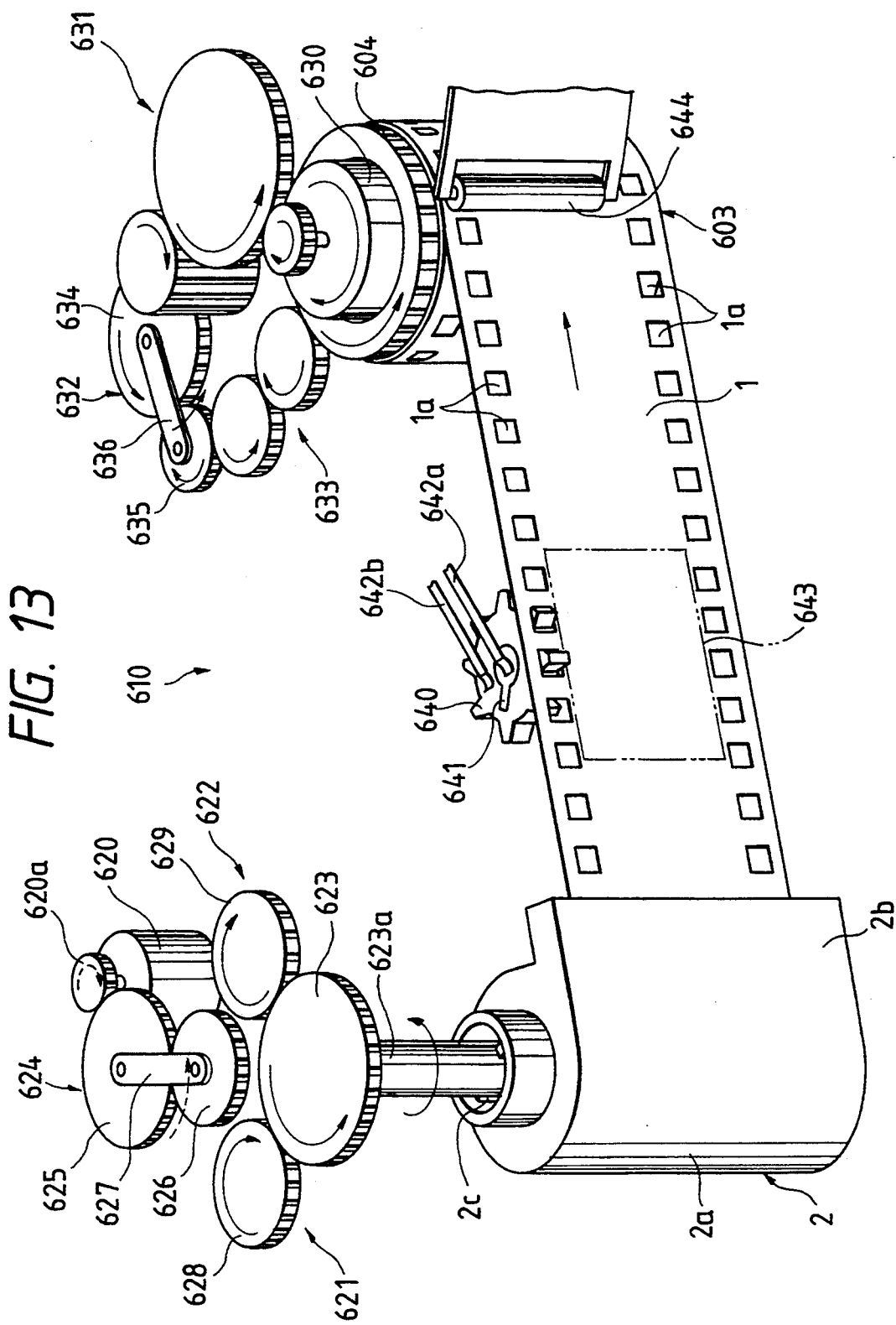

The winding spool 603 is driven with torque produced by the second electric motor, i.e., the film wind motor 630, the torque being transmitted through a torque transmission gear train 631, a planetary gear mechanism 632 serving as a final stage of the gear train 631 and capable of selectively transmitting the torque dependent on whether it comes into or out of mesh, and a torque transmission train 633 for winding the film, to the drive gear 604 integral with the spool 603 for performing the film winding operation (see FIG. 13). Whether the film 1 has been attached around the winding spool 603 or not and a feed amount of the film 1 per frame can be determined by applying an output of the switch, which comprises the conductor pattern 641 on the sprocket 640 and the pair of brushes 642a, 642b, to an arithmetic circuit, and then calculating the feed amount of the film 1.

Figure 14:
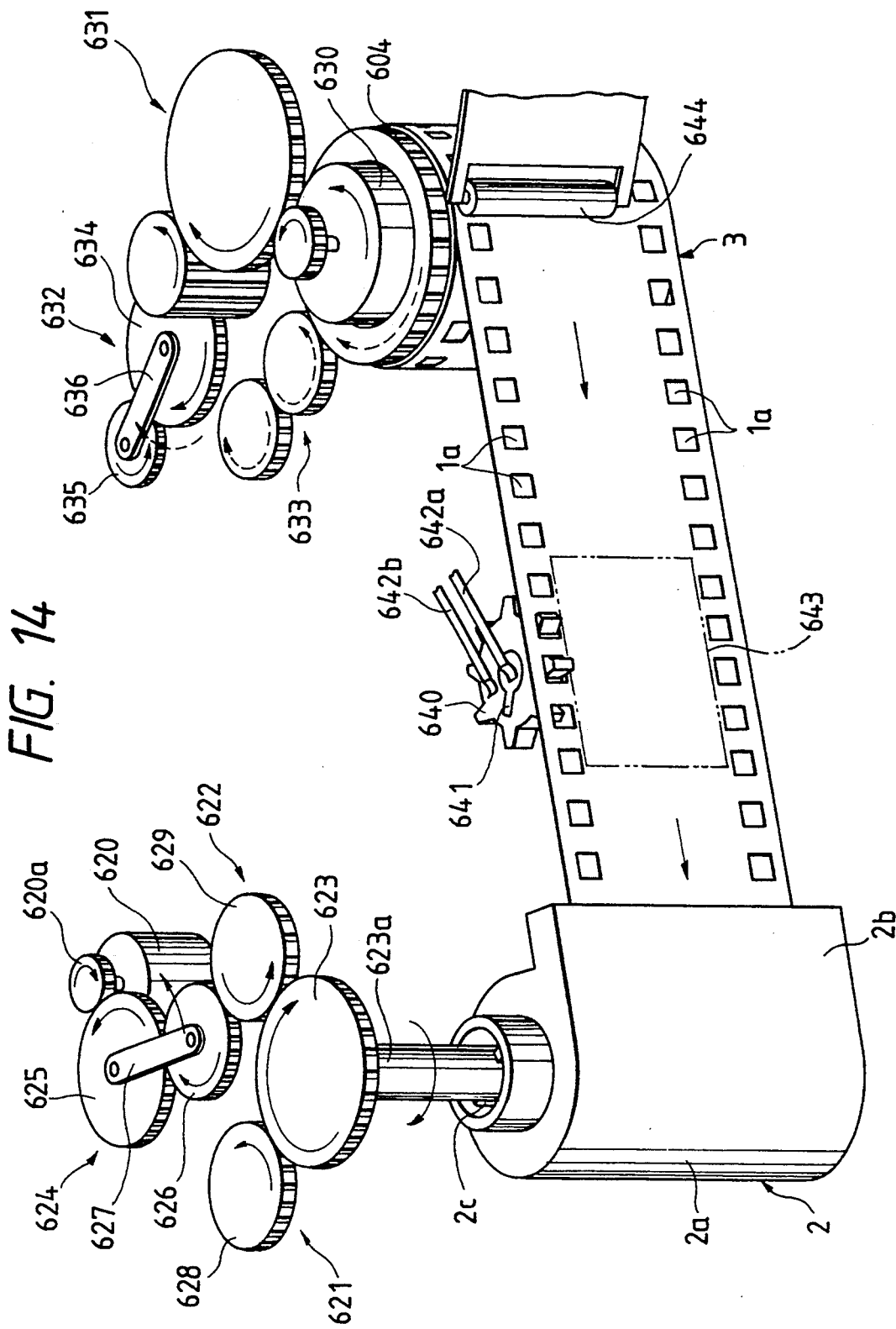

After the completion of photographing, the film can be rewound by rotating the drive gear 623 in the direction opposite to the supply direction so that the spool shaft is rotated through the engagement between the film drive key 622a and the spline 2c in the direction opposite to that in the reel-out or supply operation. In this embodiment, the first motor 620 is used as a common drive source for supplying and rewinding the film. By rotating the motor 620 in the direction opposite to that in the supply operation, and shifting a planetary gear mechanism 624 from the position shown in FIGS. 11 and 12 to be meshed with a torque transmission gear train 622 for rewinding the film as shown in FIG. 14, the torque produced by the motor 620 is transmitted to the drive gear 623 operatively coupled to the spool shaft, for thereby rotating the drive gear 623 so as to rewind the film.

The planetary gear mechanism 624 for selectively transmitting the torque from the motor 620 for supplying and rewinding the film 1 to the winding gear train 621 or the rewinding gear train 622 comprises a sun gear 625 driven by a gear at the final stage of a torque transmission gear train (comprising a single gear 620a on a motor shaft in this embodiment) coupled to the motor 620, a planet gear 626 in mesh with the sun gear 625 to rotate about its axis and around the sun gear 625, and a lever arm 627 pivot, ally supported to the sun gear 625 in coaxial relation while being driven with frictional resistance by a friction spring (not shown), and having a free end to which the planet gear 626 is pivotally supported. As the lever arm 627 is caused to angularly move with the action of the frictional resistance and torque upon rotation of the sun gear 625 in the same direction, the planet gear 626 is selectively meshed with the supplying gear train 621 or the rewinding gear train 622 (actually a respective single gear 628 or 629 in mesh with the drive gear 623) at a first or second angularly moved position to transport the torque in the desired direction. The relationship between the rotating direction of the motor 620 and the gear train 621 or 622 to be meshed with the planet gear 626 can be easily understood from the supply state shown in FIGS. 11 and 12 and the rewind state shown in FIG. 14. The meshed condition of the planet gear 626 with the supply or rewinding gear train 621 or 622 is maintained with the level arm 627 held at corresponding one of the first and second angularly moved positions due to continued rotation of the motor 620. Note that the planet gear 626 is arranged to angularly move between the first angularly moved position shown in FIGS. 11 and 12 and the second angularly moved position shown in FIG. 14 and, during a period in which torque transmission is not required, it is held in a position out of mesh with both the gears 628, 629 as shown in FIG. 13.

In addition, the planetary gear mechanism 632 for selectively transmitting the torque produced by the motor 630 for winding the film 1 dependent on whether it comes into or out of mesh with the gear train 633 for winding the film, comprises a sun gear 634 driven by a final stage gear of the torque transmission gear train 631 coupled to the motor 630, a planet gear 635 in mesh with the sun gear 634 to rotate about its axis and around the sun gear 635, and a lever arm 636 pivotally supported to the sun gear 634 in coaxial relation while being driven with frictional resistance by a friction spring (not shown), and having a free end to which the planet gear 635 is pivotally supported. As the lever arm 636 is caused to angularly move with the action of the frictional resistance and torque upon rotation of the sun gear 634 in the same direction, the planet gear 635 is selectively meshed with the gear train 633 far winding the film, so that the torque is selectively transmitted in the winding direction. The relationship between the rotating direction of the motor 630 and the direction of angular movement of the planet gear 635 coming into or out of mesh with the gear train 633 can be easily understood from the wind state shown in FIGS. 11 through 13 and the rewind state shown in FIG. 14. The meshed condition of the planet gear 635 with the winding gear train 633 is maintained with the lever arm 626 held at the corresponding angularly moved positions due to contained rotation of the motor 630.

In the above arrangement of the film feeding device 610, the present invention has a feature as follows. Midway of two lines of the torque transmission gear trains 621, 622 for transmitting the torque from the film supply/rewind motor 620 to the film drive gear 623, there is provided the planetary gear mechanism 624 comprising the sun gear 625 driven by the motor side gear, the planet gear 626 in mesh with the sun gear 625 to rotate about its axis and around the sun gear 625, and the lever arm 627 pivotally supported to the sun gear 625 in coaxial relation while being driven with frictional resistance by the friction spring (not shown), and having the free end to which the planet gear 626 is pivotally supported. In the film supply operation, as the motor 620 is driven in the film supply direction, the lever arm 627 is caused to angularly move with the action of the frictional resistance and torque upon rotation of the sun gear 625 in the same dissection, whereby the planet gear 626 is meshed with the driven gear 628 of the supply gear train 621 at the first angularly moved position for transmitting the torque to the film drive gear 623. After the completion of supply of the film 1 and stop of the motor 620, when the film 1 is taken up by the winding spool 603, the lever arm 627 is caused to angularly move in the direction of mariner the planet gear 626 out of mesh with the driven gear 628 upon rotation of the film drive gear 623 owing to the difference in rotational speeds between the film drive gear 623 and the motor side gear (the sun gear 625 or the gear 620a in mesh with the sun gear).

Stated otherwise, when the motor 620 is rotated in the direction indicated by the solid arrow in FIG. 11, the lever arm 627 is angularly moved upon rotation of the sun gear 625, whereupon the planet gear 626 is meshed with the driven gear 628 as shown in FIGS. 11 and 12. Through these gears 626 and 628 being held meshed with each other, the drive gear 623 is driven to rotate in the film supply direction so that the film 1 is fed out of the cartridge 2. The supply amount of the film 1 is successively detected by the sensor means constituted by the sprocket 640 to detect the time when the leading end of the film 1 reaches the outer periphery of the winding spool 603 to be capable of being attached around or taken up by the winding spool. In response to the detection the supply/rewind motor 620 is brought to stop rotating, whereas the film winding drive system is driven by the motor 630 to rotate, as explained above.

At such a start of the film winding operation, when the supply/rewind mother 620 is stopped and, simultaneously, the winding spool 603 is rotated to take up the film rotation of the wind motor 630, the film supply drive system and the film winding drive system in the positional relationship as shown in FIGS. 11 and 12 now operate as follows. Specifically, when the film 1 is attached around and taken up by the winding spool 603 upon rotation of the spool 603, the film 1 is subjected to pulling force in the film supply direction, whereby the spool shaft in the cartridge 2 is rotated with the winding operation. This rotation of the spool shaft causes the drive gear 623 to rotate in the film supply direction, so that the driven gear 628 is also rotated as indicated by the solid arrow in FIG. 12. In this state, because the supply/rewind motor 620 is stopped, the planet gear 626 is automatically moved through the lever arm 627 in the direction of coming out of the mesh with the driven gear 628 as indicated by the solid arrow in FIG. 12 owing to the difference in rotational speeds between the driven gear 628 and the motor side gears 625, 620a. The planet gear 626 is stopped in a position out of mesh with the driven gear 628 to disconnect the supply/rewind motor 620 from rotation of the drive gear 623. This slate corresponds to the positional relationship shown in FIG. 13. It can be easily understood that the film is taken up successively in such state as explained above. Furthermore, the gear train 622 for rewinding the film is arranged such that the planet gear 626 is not brought into mesh with the driven gear 629 of the gear train 622 on the above occasion, though coming out of mesh with the driven gear 627.

With the arrangement explained above, in the operations of supplying and winding the film 1, the torque transmission gear trains 621, 622 are automatically connected and disconnected between the supply/rewind motor 620 and the drive gear 623 upon movement of the planet gear 626 of the planetary gear mechanism 624 by making use of the rotation transmitted from the motor 620 and the rotation transmitted from the drive gear 623, respectively. There can thus be obtained the advantage that both the supply and winding drive systems are driven in desired conditions without needing intricate control despite the simple structure.

In the above arrangement of this embodiment, when the film 1 is taken up by the predetermined number of frames and the sprocket 640 detects the completion of photographing, the motor 620 is controlled such that its rotation is reversed from the direction indicated by the solid arrow in FIG. 11 to the direction indicated by the broken arrow in FIG. 13. The planetary gear mechanism 624 is thereby switched from the film winding state shown in FIG. 13 to the film rewinding state shown in FIG. 14. More specifically, the planet gear 626 of the planetary gear mechanism 624 is caused to angularly move to the second angularly moved position where it is meshed with the driven gear 629 of the film rewinding gear train 622 coupled to, the film drive gear 623, thereby transmitting the torque in the rewinding direction from the motor 620 to the film drive gear 623. As a result, the operation of rewinding the film 1 into the cartridge 2 is performed. When the film i is rewound until the sprocket 640 is not engaged with any perforations 1a in the film 1, the aforesaid film movement sensor switch can no longer issue the on/off pulse signal, enabling it to detect the state that the film is rewound to the position of the sprocket 640. After continuing to rotate the motor 620 for a predetermined period of time from that state, the motor 620 is stopped at the liming when the film 1 has been certainly rewound into the cartridge 2, whereby the rewinding operation is completed.

After the completion of the film winding operation, the planet gear 635 of the planetary gear mechanism 632 associated with the wind motor 630 may be meshed with the winding gear train 633 on rare occasions. If such an event happens, since the film 1 is run to be rewound upon rotation of the motor 620 in the rewinding direction and the spool 603 is rotated in the direction opposite to the winding direction to allow rewinding of the film, torque is transmitted from the drive gear 604 to the planet gear 635 in such a rotational direction that the lever arm 636 of the sun gear 634 is angularly moved to keep the planet gear 635 meshed with the winding gear train 633. Then, the rotation of the planet gear 635 is finally transmitted to the motor 630 through the sun gear 634 and the gear train 631, thereby impeding the film rewinding operation. Specifically, in such an event, the motor 630 is rotated by external forces and acts as a dynamo so that additional load is produced and applied to the motor 620. To avoid that trouble, it is desirable that prior to rotating the motor 620 in the rewinding direction, the wind motor 630 is rotated backwardly as a preliminary step to displace the planet gear 635 to a position where it will remain out of mesh.

The above arrangement apparently has the advantage that the operations of supplying the film from the cartridge 2, winding it around the spool and rewinding it into the cartridge can be performed properly and reliably by using the two motors 620, 630.

Particularly, according to this embodiment, the torque produced by the two motors 620, 630 is transmitted to only the respective gear trains arranged near the motors 620, 630. Thus, there is no need of any gear train for transmitting torque from one mother to the other motor on the opposite side while bypassing the aperture 643 in confronted relation to the photographing optical system at the center of the camera body along the upper or lower side thereof. As a result, it is possible to provide the film drive system in the camera, which is structured with effective utilization of space and high efficiency.

A drive circuit and a control sequence for the film feeding device 610 arranged as explained above will now be described with reference to FIGS. 4 through 8 and FIG. 15.

FIG. 4 is a block diagram of the drive circuit for carrying out the respective operations. In the drawing, denoted by 60 is a microcomputer (hereinafter referred to as a CPU), 61 is a power supply battery, 62 is a cartridge sensor switch for detecting a loading of the cartridge 2 into the camera in interlock with motion of a sensor member (not shown), 63 is a cartridge cover sensor switch turned on by a sensor member (not shown) which is operated upon closing a cartridge cover after the cartridge 2 has been loaded, 64 is a release switch turned on in interlock with depressed motion of a release button (not shown), and 65 is a rewinding manual switch turned on in interlock with depressed motion of a rewinding manual button (not shown). These switches 62–65 are connected to input ports $I_1$–$I_4$ of the CPU 60, respectively.

Denoted by 66, 67 are motor control circuits for controlling the start and stop of rotations of the supply/rewind motor 620 and the wind motor 630, that are connected to output ports $O_1$, $O_2$; $O_3$, $O_4$ of the CPU 60, respectively. These motors 620, 630 are driven to rotate forwardly (i.e., in the directions of supplying and winding the film) when only ports $O_1$, $O_3$ take a high level, driven to rotate backwardly (i.e., in the direction of rewinding the film, etc.) when only the ports $O_2$, $O_4$ take a high level, and are stopped when both of the paired ports take a low level.

Denoted by 68 is a counter for counting output pulses of a film movement sensor switch 69, which comprises the conductor pattern 641 and the pair of brushes 642a, 642b and is turned on/off in interlock with the sprocket 640. The counter 68 outputs a counted value to the CPU 60, and the counted value is reset to zero in response to a command from the CPU 60. Further, denoted by 70 is a pull-up resistor for pulling up the brush 642b to the battery 61, the brush 642b serving as one end of the switch 69 to come into or out of contact with the conductor pattern 641 and being connected to the counter 68 as well.

Denoted by 71 is an exposure control device for the camera, including a shutter, an iris and an iris controller, to control a shutter speed and an iris opening in response to commands from the CPU 60.

With the above circuit arrangement, when the battery 61 is loaded into the camera, the CPU 60 starts execution of the program. As will be seen from FIG. 5, selling of the cartridge 2 into the camera is confirmed dependent on whether the cartridge sensor switch 62 is turned on or off (step 101). If the cartridge 2 is confirmed as being set, then a step 102 confirms whether the cartridge cover is closed or not with the aid of the cartridge cover sensor switch 63. In response to the confirmation of the cartridge cover as being closed, the film supply drive system is operated to feed the film 1 out of the cartridge 2 in a step 103.

This film supply step 103 is detailed in FIG. 6. In a step 201, the motor 620 is started to rotate forwardly (i.e., in the supply direction) through the motor control circuit 66 shown in FIG. 4 in response to a command from the CPU 60, thereby supplying the film 1. In a next step 202, the pulse signal issued from the switch 69 upon rotation of the sprocket 640 is integrated by the counter 68 to calculate a supply amount of the film 1, to thereby determine whether the film 1 has been supplied or not in a predetermined amount necessary for the film 1 to reach the winding spool 603. At the time the supply amount of the film reaches the predetermined one, the motor 620 is stopped in response to a command from the CPU 60 for stopping the film supply operation in a step 203. Then, the counted value of the counter 68 is reset to zero in a step 204, followed by returning to the main program and proceeding to a step 104 in FIG. 5.

In the step 104, the winding spool 603 of the camera is rotated for attaching the film 1 around the spool 603. This film attachment step is detailed in FIG. 7. In a step 301, the motor 630 is rotated forwardly in the winding direction through the motor control circuit 67 in response to a command from the CPU 60, thereby attaching and winding the film I around the spool 603. In a next step 302, whether the wind amount of the film 1 has reached a predetermined value or not is confirmed using the counter 68 in a like manner to the above. If the predetermined wind amount of the film is confirmed, the motor 630 is stopped (step 303) and the counter 68 is reset to zero (step 304), followed by returning to the main program and proceeding to a step 105 in FIG. 5.

In the step 105, whether the rewinding manual switch 64 is turned on or off is confirmed. In the absence of an instruction to rewind the film, the control flow proceeds to a step 106. The step 106 determines the presence or absence of a release action (i.e., an instruction of photographing). In a next step 107, film sensitivity from a film sensitivity setting device (not shown), brightness of a subject from a subject brightness setting device (not shown), etc. are introduced to calculate a shutter speed and an iris opening. Based on the calculated parameters, the exposure control device 71 is controlled to perform a series of steps for taking a photograph. Afterward, the film is wound or taken up frame by frame in a step 108. This film wind step 108 is detailed in FIG. 8.

More specifically, the film is wound by rotating the motor 630 forwardly in response to a command from the CPU 60 to rotate the spool 603 in a step 401 of FIG. 8. A next step 402 determines whether the movement amount of frame 1 has reached or not a value corresponding to one frame. Then, the motor 630 is stopped in a step 403 and the counter is reset to zero in a step 404, followed by returning to the step 105 in the main program. In this way, a sequence of taking photographs frame by frame will be repeated.

On the other hand, if an instruction to rewind the film is confirmed in the step 105, the film 1 which has been taken up around the spool 603 is rewound into the cartridge 2 in a step 109. After the completion of rewinding, determination is made as to whether the cartridge cover is opened or not (step 110), and then whether the cartridge 2 is present or absent (step 111). Removal of the cartridge 2 is thus confirmed, followed by returning to the initial step 101.

Figure 15:
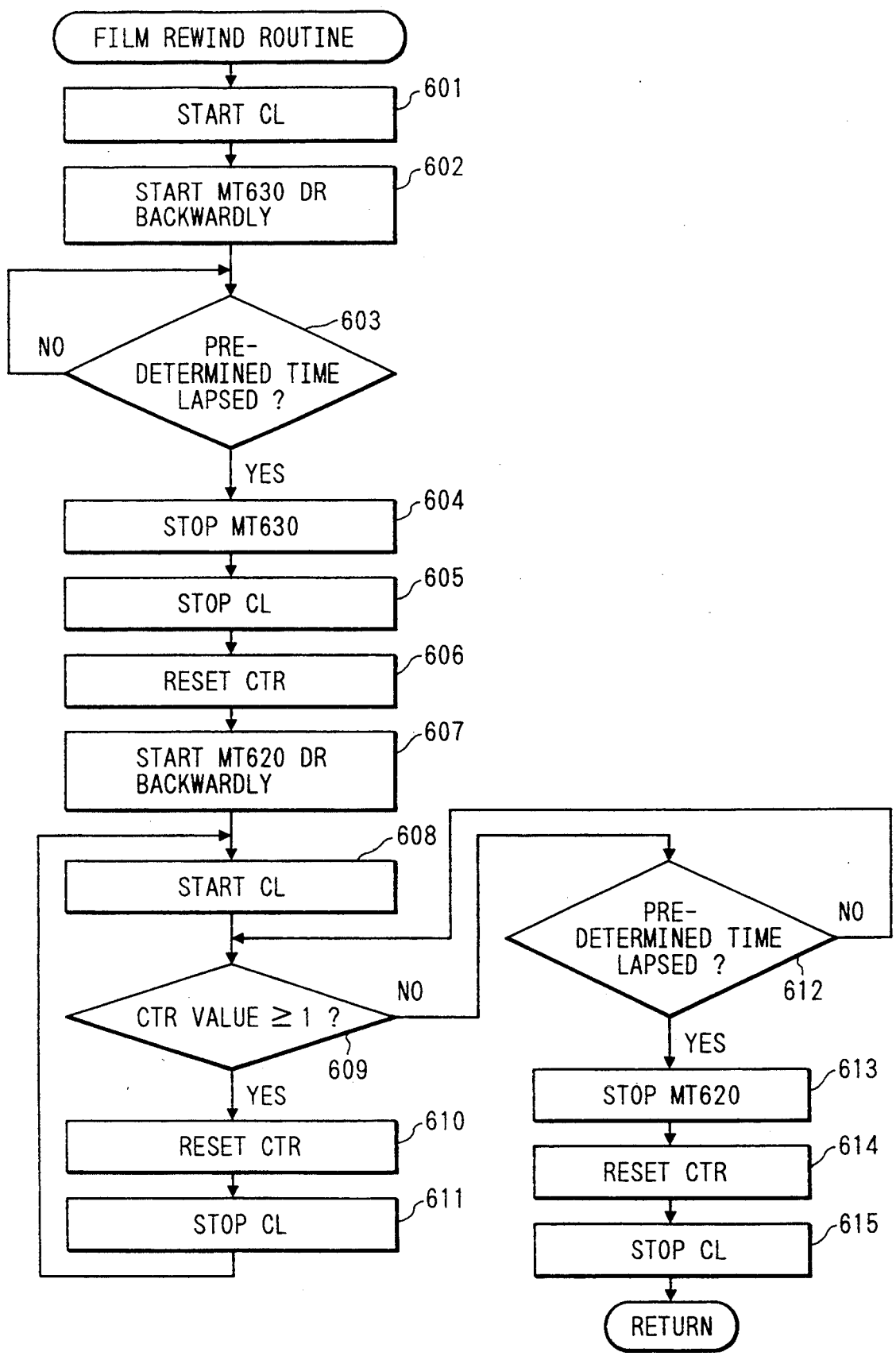
FIG. 15 is a flowchart for explaining the operations of the device.

The above film rewind step is detailed in FIG. 15. Through steps 601–606, clocking (measurement) of time in which the wind motor 630 is rotated backwardly is first set to start; the wind motor 630 is rotated backwardly; whether predetermined time enough to certainly disconnect the planet gear 635 in the winding drive; system from the gear train 633 has lapsed or not during the backward rotation of the motor 630 is determined; the motor 630 is stopped; the time clocking is stopped; and then the counter is reset.

Next, as shown in steps 607–611, the film supply/rewind motor 620 is started to rotate backwardly and, at the same time, time clocking to determine whether the film is still moving or not is started. If the counted value is equal to or larger than 1, it is confirmed that the film is still moving or under rewinding. Then, the counted value is reset to zero and the time clocking is stopped, followed by returning to the step 608 to start the time clocking again.

Meanwhile, if the counted value is zero in the step 609, predetermined time is allowed to lapse in a step 612, thereby permitting further movement of the film for the complete rewinding. In other words,, a period of time required to reel the film 1 from the position of the sprocket 640 into the cartridge 2 is reserved by lapse of the predetermined time. Afterward, through steps 613–615, the motor 620 is stopped, the counter is reset, and the time clocking is stopped, followed by returning to the step 110 in the main program. It will be easily understood that the film 1 is thus completely rewound into the cartridge 2.

Note that the present invention is not limited to the structure of this embodiment illustrated above, and configurations, structures, etc. of the respective components, including the arrangement of the film feeding device 610, can be optionally changed and modified as appropriate into a variety of modifications. For example, the foregoing embodiment has been described in connection with the case of a usual film feeding method in which the film 1 is supplied from the cartridge 2 loaded in the camera to be attached around the winding spool 603, then progressively taken up by the spool 603 while taking a photograph frame by frame and, after the completion of photographing, the spool shaft of the cartridge 2 is rotated to rewind the film 1 into the cartridge 2. However, the present invention is not limited to that method, and is apparently also applicable to another film feeding method in which the unexposed film 1 is once entirely wound around the winding spool 603 immediately after loading of the cartridge 2, and the film is then taken up to run back into the cartridge 2 while photographing each frame. In this case, the first motor 620 is used as a drive source for operations of supplying the film and taking it up frame by frame, whereas the second motor 630 serves as a drive source for winding the film around the winding spool 603 immediately after loading of the cartridge 2. Although the operation sequence and the functions or names allocated to the respective parts are somewhat different from those in the above embodiment, they can be easily understood in consideration of the relationship between the feed direction of the film 1 and the functions of the respective parts because no changes are required in the structure.

As described above, the film feeding device according to this embodiment of the present invention comprises a film supply/rewind electric motor for supplying a film from a supply outlet and rewinding the film into the supply outlet by driving a spool shaft of a film cartridge to rotate forwardly and backwardly, a planet gear of a planetary gear mechanism meshing with a sun gear, which is driven by the supply/rewind motor to rotate, and angularly moved around the sun gear between first and second angularly moved positions, torque transmission gears for supplying and rewinding the film which are arranged to be meshed with the planet gear at the first and second angularly moved positions, respectively, a film drive gear coupled to those supply and rewind gears and driven to rotate forwardly and backwardly for rotating the spool shaft, a winding spool for taking up the film supplied from the cartridge, and a film wind electric motor for driving the winding spool to rotate. Therefore, the following excellent advantages can be obtained despite the simple arrangement.

(1) As a common element of the torque transmission systems for transmitting the torque from the film supply/rewind motor to the supply gear and the rewind gear both coupled to the film drive gear for rotating the spool shaft of the cartridge, the planet gear of the planetary gear mechanism is employed which is held in mesh with the sun gear driven by a motor side gear to be angularly moved around the sun gear to the first and second angularly moved positions. By making the planet gear meshed with the supply gear and rewind gear at the first and second angularly moved positions, respectively, it is possible to properly and reliably rotate the drive gear forwardly for supplying the film from the cartridge, and rotate the drive gear backwardly for rewinding the film into the cartridge.

(2) The drive system for supplying and rewinding the film is disposed on one side of a camera independently of the drive system for winding the film which is disposed on the other side of the camera, and comprises the wind motor driven to rotate the winding spool and the associated torque transmission system. There is thus no need of arranging a torque transmission system or the like while bypassing the aperture section of the camera along the upper or lower side thereof. This permits it to achieve effective utilization of space, including the upper and lower sides of the aperture section, and provide the structure arranged with high efficiency.

(3) With the separate motors and the associated torque transmission systems being just disposed on the opposite sides of the camera, respectively, the film can be supplied and rewound by rotating the spool shaft of the cartridge forwardly and backwardly, and can be taken up upon rotation of the winding spool in respective desired conditions.

What is claimed is:

1. A film feeding device for a camera into which is loaded a film cartridge having a spool shaft rotatable in a supply direction for driving a leading end of film of the cartridge outwardly through a supply outlet of the cartridge, comprising:

an electric motor rotated in a first direction for driving said spool shaft to rotate in the supply direction for supplying the film;

a torque transmission gear train which transmits torque produced by said electric motor;

a film drive gear located as a final stage of said torque transmission gear train to receive the torque transmitted from said electric motor, and having a torque transmission part engaged with said spool shaft to rotate said spool shaft in said supply direction when said cartridge is loaded into said camera;

a winding spool part, said winding spool part including a winding spool for attachment thereto of the film supplied from said cartridge and then taking up the film in the supply direction upon winding rotation; and a sensor, said sensor detecting arrival of the film to said winding spool and then stopping rotation of said electric motor;

wherein said torque transmission gear train has a planetary gear train comprising a sun gear driven by a motor-drive gear and a planet gear, and said planet gear is supported to be angularly moved to come into mesh with a driven gear for driving said film drive gear responsive to the torque transmitted from said motor, and to be angularly moved to come out of mesh with said driven gear responsive to relative rotation produced between said film drive gear and said motor-driven gear, when the film is taken up by said winding spool.

2. A film feeding device according to claim 1, wherein said planetary gear train further has an arm for coupling said sun gear to said planet gear, said arm being frictionally driven by said sun gear to angularly move said arm in the direction corresponding to the rotating direction of said sun gear.

3. A film feeding device according to claim 1, wherein said sensor has a sprocket engaged with perforations in the film and a circuit for detecting rotation of said sprocket, and arrival of the film to said winding spool is sensed when said circuit detects a predetermined number of rotations of said sprocket.

4. A film feeding device according to claim 1, wherein:
  said winding spool part comprises a second electric motor, a second sun gear driven by a gear that is driven by said second electric motor, a second planet gear, a second arm for coupling said second sun gear to said second planet gear, said second arm being frictionally driven by said second sun gear for angularly moving said second arm in the direction corresponding to the rotating direction of said second sun gear, and a drive gear for driving said winding spool, and wherein a rewind gear is meshed with said film drive gear for rewinding said spool shaft of said cartridge,
  wherein said second planet gear is meshed with said drive gear for driving said winding spool to take up the film when said second electric motor is rotated forwardly, and said second planet gear is meshed with said rewind gear for driving said spool shaft of said cartridge to rewind the film when said second electric motor is rotated backwardly.

5. A film feeding device according to claim 4, wherein the first-mentioned electric motor is rotated in a direction opposite to said first direction prior to said rewinding.

6. A film feeding device into which is loaded a film cartridge having a spool rotatable in a supply direction for driving a leading end of film of the cartridge outwardly through a supply outlet of the cartridge, comprising:
  an electric motor rotated in a first direction for driving said spool shaft to rotate in the supply direction for supplying the film;
  a torque transmission gear train which transmits torque produced by said electric motor;
  a film drive gear located as a final stage of said torque transmission gear train to receive the torque transmitted from said electric motor, and having a torque transmission part engaged with said spool shaft to rotate said spool shaft in said supply direction;
  a winding spool part, said winding spool part including a winding spool for attachment thereto of the film supplied from said cartridge and then taking up the film in the supply direction upon winding rotation; and
  a sensor, said sensor detecting arrival of the film to said winding spool and then stopping rotation of said electric motor;
  wherein said torque transmission gear train has a planetary gear train comprising a sun gear driven by a motor driven gear and a planet gear, and
  said planet gear is supported to be angularly moved to come into mesh with a driven gear for driving said film drive gear responsive to the torque transmitted from said motor, and to be angularly moved to come out of mesh with said driven gear responsive to relative rotation produced between said film drive gear and said motor driven gear, when the film is taken up by said winding spool.

* * * * *